(12) United States Patent
Nam et al.

(10) Patent No.: US 11,057,091 B2
(45) Date of Patent: Jul. 6, 2021

(54) REFERENCE SIGNALS FOR TRACKING

(71) Applicant: QUALCOMM Incorporated, San Diego, CA (US)

(72) Inventors: Wooseok Nam, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/253,829

(22) Filed: Jan. 22, 2019

(65) Prior Publication Data
US 2019/0260447 A1 Aug. 22, 2019

Related U.S. Application Data

(60) Provisional application No. 62/710,363, filed on Feb. 16, 2018.

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0695* (2013.01); *H04L 5/0023* (2013.01);
(Continued)

(58) Field of Classification Search
CPC ... H04B 7/0626; H04L 5/0048; H04L 5/0092; H04L 2027/0083; H04L 41/0813; H04L 29/06183; H04L 1/0693; H04L 1/075; H04L 65/00; H04L 47/70; H04L 47/76; H04W 72/0453; H04W 72/04;
(Continued)

(56) References Cited

U.S. PATENT DOCUMENTS

2013/0114535 A1   5/2013  Ng et al.
2015/0098347 A1*  4/2015  Guo ................. H04W 72/02
                                              370/252

(Continued)

OTHER PUBLICATIONS

International Search Report and Written Opinion—PCT/US2019/014681—ISA/EPO—dated Jul. 3, 2019.
(Continued)

*Primary Examiner* — Warner Wong
(74) *Attorney, Agent, or Firm* — Linda G. Gunderson; Holland & Hart LLP

(57) ABSTRACT

Methods, systems, and devices for wireless communications are described. A base station may identify a channel condition change (e.g., a beam switch, a bandwidth part (BWP) switch) for a channel between the base station and a user equipment (UE). The base station may transmit a downlink control information (DCI) that indicates the identified channel condition change and a resource allocation for transmissions between the base station and the UE. The base station may select a pattern of time and frequency resources for a channel state information reference signal (CSI-RS) for tracking for the UE, and transmit the CSI-RS using the identified pattern. The UE may identify the pattern based on the received DCI, and receive the CSI-RS using the identified pattern of time and frequency resources.

29 Claims, 17 Drawing Sheets

(51) Int. Cl.
| | |
|---|---|
| *H04W 16/02* | (2009.01) |
| *H04W 16/28* | (2009.01) |
| *H04W 72/04* | (2009.01) |
| *H04L 25/02* | (2006.01) |
| *H04L 27/26* | (2006.01) |
| *H04L 12/24* | (2006.01) |
| *H04W 72/12* | (2009.01) |

(52) U.S. Cl.
CPC .......... *H04L 5/0048* (2013.01); *H04L 5/0085* (2013.01); *H04L 5/0091* (2013.01); *H04L 5/0092* (2013.01); *H04L 25/0226* (2013.01); *H04L 27/2655* (2013.01); *H04L 27/2666* (2013.01); *H04W 16/02* (2013.01); *H04W 16/28* (2013.01); *H04W 72/042* (2013.01); *H04W 72/046* (2013.01); *H04W 72/0453* (2013.01); *H04L 5/0041* (2013.01); *H04L 5/0064* (2013.01); *H04L 41/0813* (2013.01); *H04W 72/0406* (2013.01); *H04W 72/1226* (2013.01)

(58) Field of Classification Search
CPC ........... H04W 72/0406; H04W 72/042; H04W 72/046; H04W 72/1226; H04W 16/02; H04W 16/28; H04W 24/00; H04W 28/00; H04W 72/00
See application file for complete search history.

(56) References Cited

U.S. PATENT DOCUMENTS

| | | | |
|---|---|---|---|
| 2015/0271814 A1 | 9/2015 | Park et al. | |
| 2016/0301505 A1* | 10/2016 | Furuskog | H04B 7/0452 |
| 2017/0311311 A1* | 10/2017 | Frenne | H04L 5/0048 |
| 2017/0359745 A1 | 12/2017 | Lee et al. | |
| 2018/0219606 A1 | 8/2018 | Ng et al. | |
| 2019/0044679 A1* | 2/2019 | Manolakos | H04W 72/042 |
| 2019/0053089 A1* | 2/2019 | Kwak | H04B 7/0478 |
| 2019/0115955 A1* | 4/2019 | John Wilson | H04W 76/27 |
| 2019/0132845 A1* | 5/2019 | Babaei | H04W 72/0453 |
| 2019/0165847 A1* | 5/2019 | Kim | H04L 5/0091 |
| 2019/0174547 A1* | 6/2019 | Khoryaev | H04B 17/318 |
| 2019/0190759 A1* | 6/2019 | Zhang | H04L 5/0051 |
| 2019/0261336 A1* | 8/2019 | Liu | H04W 72/08 |
| 2019/0320453 A1* | 10/2019 | Hosseini | H04L 25/0202 |
| 2019/0327021 A1* | 10/2019 | Wang | H04W 72/042 |
| 2019/0327719 A1* | 10/2019 | Liu | H04B 7/0626 |
| 2019/0334601 A1* | 10/2019 | Han | H04B 7/0643 |
| 2019/0356546 A1* | 11/2019 | Zhang | H04L 5/0096 |
| 2020/0021347 A1* | 1/2020 | Kim | H04W 76/27 |
| 2020/0153552 A1* | 5/2020 | Zhang | H04W 76/27 |

OTHER PUBLICATIONS

Partial International Search Report—PCT/US2019/014681—ISA/EPO—dated May 9, 2019.
Samsung: "Remaining Issues on Quasi Co-Location Between CSI-RS, CRS and DMRS", 3GPP Draft, R1-124558 Remaining Issues on Quasi Co-Location, 3rd Generation Partnership Project (3GPP), Mobile Competence Centre, 650, Route Des Lucioles, F-06921 Sophia-Antipolis Cedex, France, vol. RAN WG1, No. San Diego, USA, Oct. 8, 2012-Oct. 12, 2012, Oct. 12, 2012 (Oct. 12, 2012), XP050662440, pp. 1-5, Retrieved from the Internet: URL: http://www.3gpp.org/ftp/tsg_ran/WG1_RL1/TSGR1_70b/Docs/ [retrieved on Oct. 12, 2012].

* cited by examiner

REFERENCE SIGNALS FOR TRACKING

CROSS REFERENCES

The present Application for Patent claims the benefit of U.S. Provisional Patent Application No. 62/710,363 by NAM, et al., entitled "APERIODIC TRACKING REFERENCE SIGNALS," filed Feb. 16, 2018, assigned to the assignee hereof, and expressly incorporated by reference herein in its entirety.

BACKGROUND

The following relates generally to wireless communication, and more specifically to channel state information reference signal (CSI-RS) for tracking.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may use reference signals for a variety of purposes, e.g., channel estimation, beam tracking, synchronization, and the like. Some wireless communication systems may use a reference signal configuration, e.g., a tracking reference signal (TRS), or a channel state information reference signal (CSI-RS), where the reference signal is transmitted periodically in defined resource elements (REs) during a transmission time interval (TTI), etc. Generally, the periodic reference signals may be used for time and/or frequency tracking, Doppler/delay spread estimation, and the like. Resources used to send and receive periodic reference signals may be configured using a configuration signal, such as a radio resource control (RRC) signal. However, a UE and a base station may become partially or entirely out of synchronization due to UE mobility, time or frequency shifting, etc. Regardless of the cause of the loss of synchronization, a channel condition change may occur that may result in a need for the UE and the base station to be at least partially realigned. In some cases, the UE and the base station may become substantially misaligned between instances where the periodic reference signals are transmitted, such that periodic reference signal transmission may delay the UE handling the channel condition change appropriately.

SUMMARY

The described techniques relate to improved methods, systems, devices, or apparatuses that support channel state information reference signal (CSI-RS) for tracking. CSI-RS may include an aperiodic tracking reference signal (A-TRS). Generally, the described techniques provide mechanisms for efficient and reliable communication of an aperiodic reference signal for frequency and time tracking, such as CSI-RS for tracking, between a base station and a user equipment (UE). In some cases, the transmission of the CSI-RS may be trigger-based. For example, an indication may be transmitted in response to a channel condition change occurring. The indication may provide or otherwise indicate some or all of the resources (e.g., time and frequency resources) to be used for transmission of the CSI-RS, such as a transmission timing parameter for transmission of the CSI-RS with respect to a timing of the channel condition change. The indication may explicitly or implicitly provide or otherwise indicate the CSI-RS resources in a downlink control indicator (DCI), or the like. In response to the channel condition change occurring, the base station may transmit, and the UE may receive, the CSI-RS using the resources identified. The UE may use the CSI-RS for frequency and time tracking.

A method for wireless communication at a UE. The method may include receiving DCI that indicates a resource allocation for transmissions between the UE and a base station, identifying, based at least in part on the received DCI, a pattern of time and frequency resources allocated for a CSI-RS for tracking to be transmitted by the base station, and receiving the CSI-RS using the identified pattern of time and frequency resources.

An apparatus for wireless communication is described. The apparatus may include means for receiving DCI that indicates a resource allocation for transmissions between the apparatus and a base station, means for identifying, based at least in part on the received DCI, a pattern of time and frequency resources allocated for a CSI-RS for tracking to be transmitted by the base station, and means for receiving the CSI-RS using the identified pattern of time and frequency resources.

Another apparatus for wireless communication is described. The apparatus may include a processor, memory in electronic communication with the processor, and instructions stored in the memory. The instructions may be operable to cause the processor to receive DCI that indicates a resource allocation for transmissions between the apparatus and a base station, identify, based at least in part on the received DCI, a pattern of time and frequency resources allocated for a CSI-RS for tracking to be transmitted by the base station, and receive the CSI-RS using the identified pattern of time and frequency resources.

A non-transitory computer-readable medium for wireless communication is described. The non-transitory computer-readable medium may include instructions operable to cause a processor to receive DCI that indicates a resource allocation for transmissions between the apparatus and a base station, identify, based at least in part on the received DCI, a pattern of time and frequency resources allocated for a CSI-RS for tracking to be transmitted by the base station, and receive the CSI-RS using the identified pattern of time and frequency resources.

Some examples of the method, apparatus, and non-transitory computer-readable medium described above may further include processes, features, means, or instructions for performing frequency and time tracking based at least in part on the received CSI-RS.

Some examples of the method, apparatus, and non-transitory computer-readable medium described above for identifying the pattern of time and frequency resources allocated for the CSI-RS may further include processes, features, means, or instructions for identifying a fixed bandwidth value, identifying a bandwidth of a bandwidth part in which a downlink shared channel for the apparatus is scheduled, and determining a bandwidth of the CSI-RS to be a minimum of the identified fixed bandwidth value and the identified bandwidth for the bandwidth part.

Some examples of the method, apparatus, and non-transitory computer-readable medium described above for identifying the pattern of time and frequency resources allocated for the CSI-RS may further include processes, features, means, or instructions for identifying a bandwidth of a downlink shared channel scheduled for the apparatus, and determining a bandwidth of the CSI-RS based at least in part on the identified bandwidth for the of the downlink shared channel.

Some examples of the method, apparatus, and non-transitory computer-readable medium described above may further include processes, features, means, or instructions for receiving configuration information for the CSI-RS. In some examples of the method, apparatus, and non-transitory computer-readable medium described above, the pattern of time and frequency resources allocated for the CSI-RS is identified based at least in part on the received configuration information and the received DCI.

In some examples of the method, apparatus, and non-transitory computer-readable medium described above, the configuration information may include a portion of a bandwidth, or an offset, or a periodicity, or a beam, or a density, or a subcarrier spacing, or a resource block pattern, or a combination thereof.

Some examples of the method, apparatus, and non-transitory computer-readable medium described above for receiving the configuration information for the CSI-RS may further include processes, features, means, or instructions for receiving a DCI message, or radio resource control signaling, or a combination thereof, that includes the configuration information.

Some examples of the method, apparatus, and non-transitory computer-readable medium described above may further include processes, features, means, or instructions for receiving, in the DCI, an indication to switch beams used for transmissions between the apparatus and the base station in the DCI, the pattern of time and frequency resources identified based at least in part on the indication to switch beams.

Some examples of the method, apparatus, and non-transitory computer-readable medium described above may further include processes, features, means, or instructions for performing, based at least in part on the indication to switch beams, a beam switch procedure during a same transmission time interval (TTI) during which the CSI-RS is received.

Some examples of the method, apparatus, and non-transitory computer-readable medium described above may further include processes, features, means, or instructions for performing, based at least in part on the indication to switch beams, a beam switch procedure in a first TTI different from a second TTI during which the CSI-RS is received.

Some examples of the method, apparatus, and non-transitory computer-readable medium described above may further include processes, features, means, or instructions for receiving, in the DCI, an indication to switch bandwidth parts (BWPs), and changing from an active BWP to a target BWP based at least in part on the received indication to switch BWPs.

In some examples of the method, apparatus, and non-transitory computer-readable medium described above, the apparatus changes from the active BWP to the target BWP during a same TTI during which the CSI-RS is received.

In some examples of the method, apparatus, and non-transitory computer-readable medium described above, the apparatus changes from the active BWP to the target BWP during a first TTI different from a second TTI during which the CSI-RS is received.

In some examples of the method, apparatus, and non-transitory computer-readable medium described above, the apparatus is configured to support a zero power tracking reference signal (ZP-TRS).

Some examples of the method, apparatus, and non-transitory computer-readable medium described above may further include processes, features, means, or instructions for rating matching a physical data channel transmission around time and frequency resources allocated to the ZP-TRS.

In some examples of the method, apparatus, and non-transitory computer-readable medium described above, the pattern of time and frequency resources for the CSI-RS may include discontiguous resource blocks and subcarriers.

A method for wireless communication at a base station is described. The method may include identifying a pattern of time and frequency resources for a CSI-RS for tracking for a UE, transmitting a DCI that indicates the identified pattern of time and frequency resources allocated for the CSI-RS for tracking, and transmitting the CSI-RS using the identified pattern of time and frequency resources.

An apparatus for wireless communication is described. The apparatus may include means for identifying a channel condition change for a channel between the apparatus and a UE, selecting, based at least in part on the channel condition change, a pattern of time and frequency resources for a CSI-RS for the UE, and transmitting the CSI-RS using the identified pattern of time and frequency resources.

Another apparatus for wireless communication is described. The apparatus may include a processor, memory in electronic communication with the processor, and instructions stored in the memory. The instructions may be operable to cause the processor to identify a channel condition change for a channel between the apparatus and a UE, select, based at least in part on the channel condition change, a pattern of time and frequency resources for a CSI-RS for the UE, and transmit the CSI-RS using the identified pattern of time and frequency resources.

A non-transitory computer-readable medium for wireless communication is described. The non-transitory computer-readable medium may include instructions operable to cause a processor to identify a channel condition change for a channel between the apparatus and a UE, select, based at least in part on the channel condition change, a pattern of time and frequency resources for a CSI-RS for the UE, and transmit the CSI-RS using the identified pattern of time and frequency resources.

Some examples of the method, apparatus, and non-transitory computer-readable medium described above may further include processes, features, means, or instructions for transmitting, to the UE, configuration information for the CSI-RS, the configuration information including a portion of a bandwidth, or an offset, or a periodicity, or a beam, or a density, or a subcarrier spacing, or a resource block pattern, or a combination thereof.

In some examples of the method, apparatus, and non-transitory computer-readable medium described above, the configuration information is transmitted in a DCI message, or radio resource control signaling, or a combination thereof.

In some examples of the method, apparatus, and non-transitory computer-readable medium described above, the channel condition change may include at least one of a BWP switching occasion, or a beam switch occasion, or a combination thereof.

Some examples of the method, apparatus, and non-transitory computer-readable medium described above may further include processes, features, means, or instructions for identifying a threshold value for a beam parameter associated with the channel between the apparatus and the UE, where the beam parameter may include a delay spread, or a Doppler spread, or a Doppler shift, or an average gain, or an average delay, or an angle of arrival, or an angle of departure, or a combination thereof, and monitoring for a beam misalignment associated with the channel based at least in part on the identified threshold value.

Some examples of the method, apparatus, and non-transitory computer-readable medium described above may further include processes, features, means, or instructions for detecting the beam misalignment associated with the channel based at least in part on a value of a measured beam parameter being above the identified threshold value.

Some examples of the method, apparatus, and non-transitory computer-readable medium described above may further include processes, features, means, or instructions for transmitting, in the DCI, an indication to switch beams for communication via the channel based at least in part on the detected beam misalignment, where the DCI further may include the beam switch indication.

In some examples of the method, apparatus, and non-transitory computer-readable medium described above, the beam parameter may include at least one of a physical data control channel (PDCCH) error rate, a physical data shared channel (PDSCH) error rate, a reference signal received quality (RSRQ), a signal-to-interference-plus-noise ratio (SINR), a reference signal received power (RSRP), or a combination thereof.

Some examples of the method, apparatus, and non-transitory computer-readable medium described above may further include processes, features, means, or instructions for identifying a target BWP of a carrier to be used to communicate with the UE on the channel, the target BWP different from an active BWP being used to communicate with the UE on the channel.

Some examples of the method, apparatus, and non-transitory computer-readable medium described above may further include processes, features, means, or instructions for transmitting, to the UE in the DCI, an indication for the UE to switch from the active BWP to the target BWP.

Some examples of the method, apparatus, and non-transitory computer-readable medium described above may further include processes, features, means, or instructions for configuring one or more fields in the DCI to indicate the channel condition change and the pattern of time and frequency resources for the CSI-RS.

Some examples of the method, apparatus, and non-transitory computer-readable medium described above may further include processes, features, means, or instructions for transmitting the DCI in a same TTI in which the CSI-RS is transmitted.

Some examples of the method, apparatus, and non-transitory computer-readable medium described above may further include processes, features, means, or instructions for transmitting the DCI in a first TTI different from a second TTI in which the CSI-RS is transmitted.

In some examples of the method, apparatus, and non-transitory computer-readable medium described above, the CSI-RS may include an A-TRS for tracking frequency and time.

DETAILED DESCRIPTION

Figure 1:
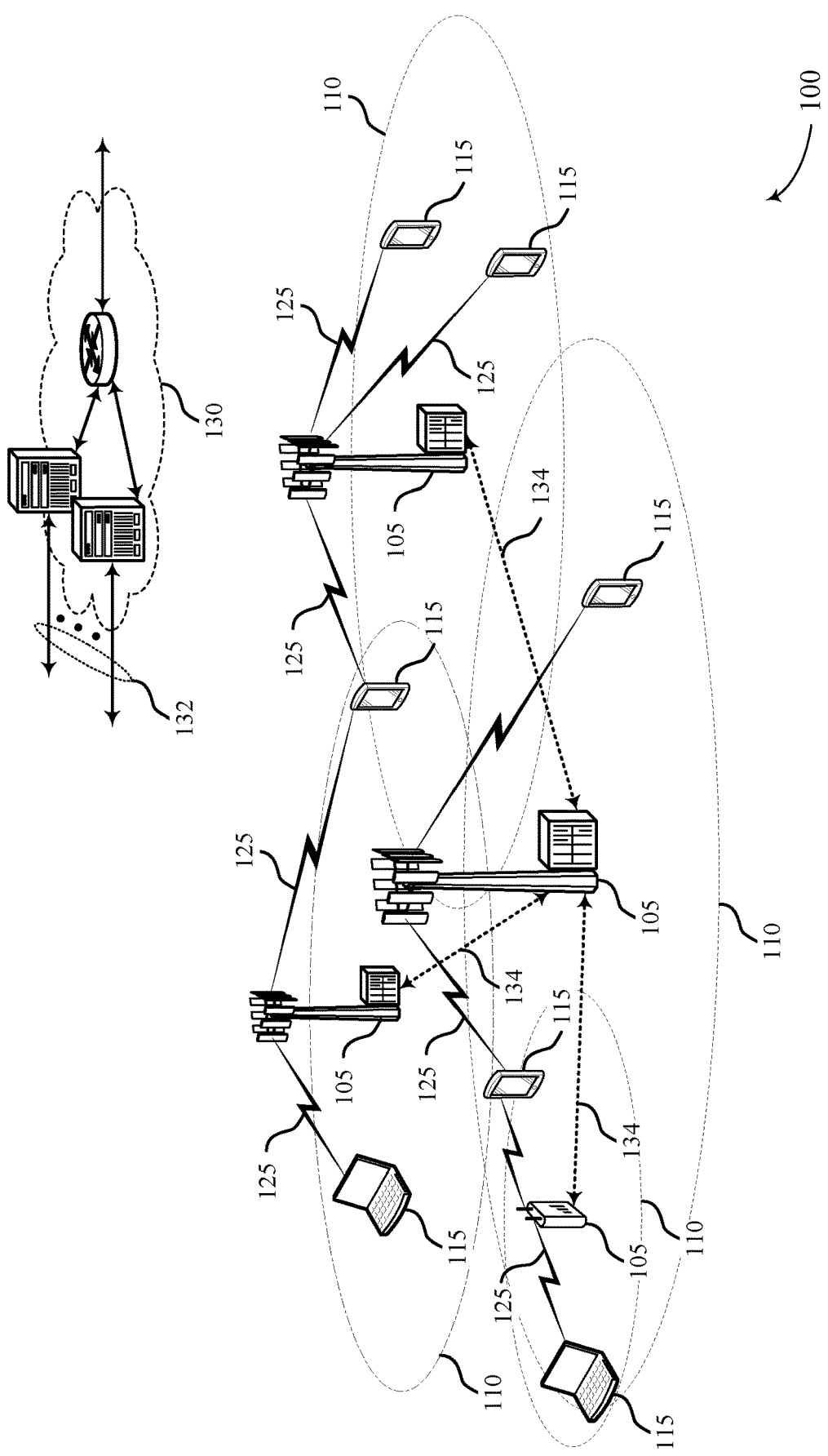
FIGS. 1 and 2 illustrate examples of a wireless communications system that supports A-TRS in accordance with aspects of the present disclosure.

Some wireless communication systems may use a reference signal transmission scheme that may be considered periodic in that the reference signals are transmitted according to a periodic schedule. While this may conserve time and frequency resources for the wireless communication system, it may come at a cost in terms of time and frequency synchronization and tracking between a base station and a user equipment (UE), e.g., due to UE mobility, time and frequency shift, etc., or other aperiodic events that impact such synchronization and tracking. The described techniques provide for transmission of a channel state information (CSI-RS) in response to an occurrence of a channel condition change at the UE. In some aspects, the resources that can be used for the CSI-RS may be indicated to the UE, e.g., in a downlink control indicator (DCI), in a medium access control (MAC) control element (CE), or the like. In some examples, the DCI may be UL DCI, or other types of DCI in other examples. In other aspects, the base station may preconfigure the UE using an indication of the CSI-RS resources, and then the channel condition change may serve as the trigger for the indicated CSI-RS resources to be used to receive a CSI-RS.

The base station and the UE may determine that the channel condition change has occurred. Examples of a channel condition change may include, but are not limited to, a change in bandwidth part (BWP), a beam change (e.g., a change in a beam for the physical downlink shared channel (PDSCH)), or both. In response to the channel condition change occurring, the base station may transmit an indication to the UE that identifies some or all of the resources to be used for transmission of the CSI-RS. For example, the indication may indicate the time and frequency resources that will be used by the base station for transmission of the CSI-RS, as well as an indication of the channel condition change (e.g., BWP switching) and the resources for the CSI-RS. The base station may transmit and the UE may receive the CSI-RS using the resources identified. The UE and the base station may use the CSI-RS for frequency and time tracking, Doppler/delay spread determination, and the like.

The resources associated with the CSI-RS may, alternatively, be preconfigured. For example, the base station may transmit a configuration signal, such as a radio resource control (RRC) signal, to the UE that identifies time and frequency resources that will be used for transmission of the CSI-RS in response to a channel condition change occurring. Accordingly, the UE and the base station may detect or otherwise determine that a channel condition change has occurred and the base station may transmit the CSI-RS in response to the channel condition change.

Aspects of the disclosure are initially described in the context of a wireless communications system. Aspects of the disclosure are further described in the context of process flows. Aspects of the disclosure are further illustrated by and described with reference to apparatus diagrams, system diagrams, and flowcharts that relate to CSI-RS.

FIG. 1 illustrates an example of a wireless communications system 100 that supports CSI-RS in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers. In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may identify a channel condition change for a channel (e.g., communication link 125) between the base station 105 and a UE 115. In some examples, the channel condition change may include at least one of a bandwidth part (BWP) switching occasion, or a beam switch occasion, or both. The base station 105 may transmit, a downlink control information (DCI), that indicates that identified channel condition change and a resource allocation for transmission between the base station 105 and the UE 115, which the UE 115 may receive. In some cases, the base station 105 may select a pattern of time and frequency resources for an CSI-RS for the UE 115. This selection may be based on the channel condition change. The base station 105 may transmit the CSI-RS using the identified pattern of time and frequency resources to the UE 115. In some cases, the base station 105 may identify a pattern of time and frequency resources for a channel state information reference signal (CSI-RS) for tracking for the UE 115, transmit DCI that indicates the identified pattern of time and frequency resources allocated for the CSI-RS for tracking, and transmit the CSI-RS using the identified pattern of time and frequency resources. The UE 115 may in some cases, identify the pattern based on the received DCI and receive the CSI-RS using the identified pattern of time and frequency resources. The UE 115 may perform frequency and time tracking based on the received CSI-RS.

Figure 2:
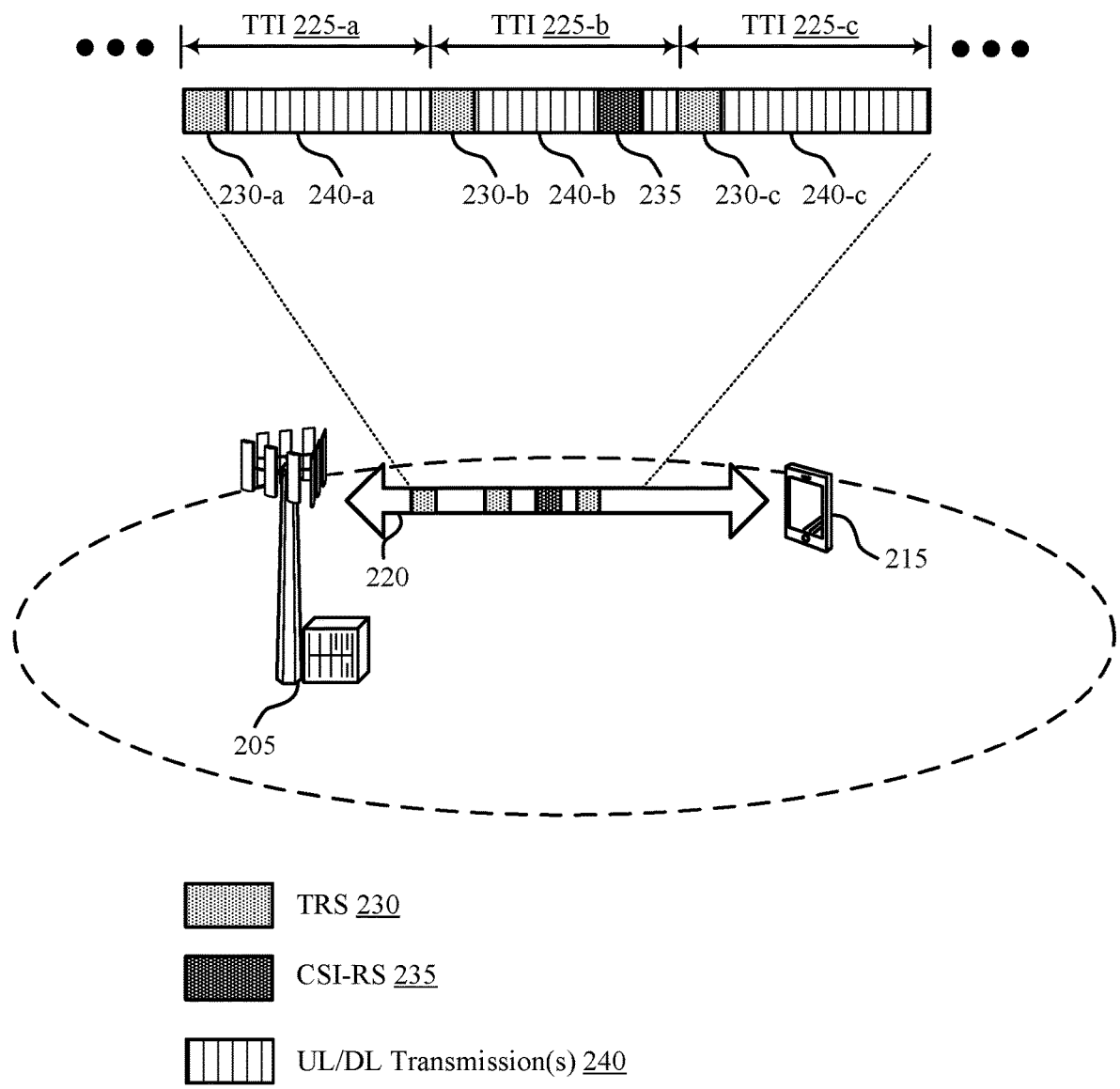

FIG. 2 illustrates an example of a wireless communications system 200 that supports CSI-RS in accordance with various aspects of the present disclosure. In some examples, the wireless communications system 200 may implement aspects of the wireless communications system 100. The wireless communications system 200 may include a base station 205 and a UE 215, which may be examples of the corresponding devices described with reference to FIG. 1. The wireless communications system 200 may also operate according to a radio access technology (RAT) such as a fifth generation (5G) new radio (NR) RAT, although techniques described herein may be applied to any RAT and to systems that may concurrently use two or more different RATs that support beamformed transmissions. In some cases, the wireless communications system 200 may support an CSI-RS for millimeter wave (mmW) communication. The CSI-RS may be configured to support channel estimation after one or more channel conditions have changed, subsequent to a periodic TRS transmission. CSI-RS transmission(s) may enhance communication efficiency and reduce latency in the wireless communications system 200.

The base station 205 may perform an RRC procedure (e.g., cell acquisition procedure, random access procedure, RRC connection procedure, RRC configuration procedure) with the UE 215. The base station 205 may be configured with multiple antennas, which may be used for directional or beamformed transmissions. In some examples, the RRC procedure may include a beam sweep procedure. As part of the RRC procedure, the base station 205 and the UE 215 may establish a bi-directional communication link 220 for communication (e.g., uplink and/or downlink communication). In some cases, the UE 215 may be time-synchronized with the base station 205. UE 215 and base station 205 may be capable of receiving periodic TRS or CSI-RS, or both, during a slot, a TTI, a shortened-TTI (s-TTI), a subframe, or a frame, etc.

In the example of wireless communications system 200, the base station 205 may transmit one or more reference signals using a number of directional or beamformed transmissions using mmW beams, where each mmW beam is transmitted in a different direction, angle, etc. The bi-directional communication link 220 may be associated with a beam pair (e.g., a downlink/uplink beam pair between the base station 205 and the UE 215). A reference signal may include a periodic TRS or an A-TRS, a channel state information-reference signal (CSI-RS), a primary synchronization signal (PSS), a secondary synchronization signal (SSS), a beam reference signal (BRS), or a combination thereof. In some examples, the A-TRS and CSI-RS may enable the UE 215 with capabilities to perform frequency and time tracking.

The base station 205 may configure a reference signal (e.g., TRS) to be UE-specific, for example, both for sub-6 GHz spectrum and above 6 GHz spectrum. In some cases, the TRS 230 may be a UE-specific reference signal (e.g., UE-specific and transmitted on resources, such as resource blocks (RBs), allocated for a specific UE on downlink resource elements) and configured with higher-layer signaling (e.g., as part of an RRC signaling, MAC control element (MAC-CE), DCI). In some examples, the base station 205 may transmit a periodic TRS 230 or an CSI-RS 235 to the UE 215 during one or more TTIs 225, in a directional or beamformed manner, which the UE 215 may receive during the TTIs 225.

In some cases, UE 215 may be configured to use CSI-RS in certain RF spectrum and not in other RF spectrum. For example, UE 215 may be configured to operate using CSI-RS for sub-6 GHz spectrum and not for above 6 GHz spectrum, or for above 6 GHz spectrum and not for sub-6 GHz spectrum, or for both sub-6 GHz spectrum and for above 6 GHz spectrum.

The TTIs 225 may be part of a resource grid that may correspond to a system bandwidth that the base station 205 may allocate to the UE 215, and the resource grid may continue indefinitely in time. Information may be organized as a function of frequency as well as time using the resource grid. A resource element in a resource grid, may span one symbol by one sub-carrier. Each resource element may carry two, four or six physical channel bits. Resource elements may be grouped into RBs, each of which may span 180 kHz (e.g., 12 sub-carriers). The base station 205 may allocate RBs to the UE 215, by allocating the symbols and sub-carriers within each TTI 225 in units of RBs to the UE 215. Each TTI 225 (e.g., TTI 225-*a*, TTI 225-*b*, and TTI 225-*c*) may span 14 modulation symbol periods (e.g., OFDM symbols) and a number of sub-carriers within a bandwidth.

In some cases, a first and second symbol period of each of the TTIs 225 may include a number of PDCCH resource elements for a PDCCH transmission. The PDCCH resource elements may transport downlink signaling, such as DCI, from the base station 205 to the UE 215. Additionally, some symbol periods may be allocated for uplink or downlink transmission(s) 240 during the TTIs 225. In some cases, a number of symbol periods (e.g., $S_n$, $S_{n+1}$, etc.) of the TTIs 225 may be allocated for periodic TRS 230 transmissions, where n is a positive integer. The periodic TRS 230 transmission may occur during scheduled symbol periods of a TTI. For example, the base station 205 may transmit a periodic TRS 230-a in allocated symbol periods (e.g., $S_n$, $S_{n+1}$, $S_{n+2}$, etc.) during TTI 225-a, a periodic TRS 230-b in allocated symbol periods (e.g., $S_n$, $S_{n+1}$, $S_{n+2}$, etc.) during TTI 225-b, and a periodic TRS 230-c in allocated symbol periods (e.g., $S_n$, $S_{n+1}$, $S_{n+2}$, etc.) during TTI 225-c, where n is a positive integer. In some cases, n may be a value configured by the base station 205, for example, during an RRC procedure. The UE 215 may receive a TRS 230 and perform one or more of frequency and time tracking operations, estimation of a power delay profile (PDP) or Doppler spread, or both associated with the bi-directional communication link 220 between the base station 205 and the UE 215.

In some cases, by having the base station 205 transmit only periodic TRS 230, the UE 215 may be delayed in determining changes in channel conditions associated with the bi-directional communication link 220, and as such may be delayed in handling the determined changes accordingly. For example, communication between the base station 205 and the UE 215 may be varying (e.g., control and data transmissions may be non-continuous and aperiodic in time and frequency). Additionally, in some cases, a beam switch or bandwidth part (BWP) switch may be triggered during communication between the base station 205 and the UE 215. As such, because of the changes in channel conditions associated with the bi-directional communication link 220, channel estimation of channel-related parameters such as average delay, delay spread, Doppler spread, Doppler shift, among others associated with the bi-directional communication link 220 may be affected.

CSI-RS may include A-TRS. A-TRS transmissions may be critical given different aperiodic events that may not be aligned with periodic TRS transmissions. For example, for the above-6 GHz spectrum, beam switching may be an example case where CSI-RS (e.g., A-TRS) may assist the UE 215 in handling the beam switching. The UE 215 may be capable to perform channel estimation to determine changes in channel-related conditions based on the periodic TRS transmissions, however, the channel estimation may be erroneous for signals received between TRS transmission periods (e.g., period between the TRS 230-b and the TRS 230-c). The wireless communications system 200 may support CSI-RS (e.g., A-TRS) transmission, such that the UE 215 may for example, receive the CSI-RS (e.g., A-TRS) 235, to perform channel estimation to adjust one or more operating characteristics (e.g., beam, antenna, BWP, etc.) and accurately receive transmissions from the base station 205. In some examples, with DCI-based beam switching, data transmission may commence, after the UE 215 performs frequency and time tracking based on TRS and CSI acquisition related to CSI-RS. As such, without CSI-RS (e.g., A-TRS), data reception at the UE 215 can be delayed up to TRS periodicity (e.g., until a next periodic TRS 230).

The wireless communications system 200 may, in some examples, support a DCI-based CSI-RS triggering procedure. The base station 205 may identify a channel condition change for a channel (e.g., associated with the bi-directional communication link 220) between the base station 205 and the UE 215. For example, the base station 205 may determine a BWP switch or beam switch, or both. A DCI may include bits or fields that explicitly indicate a CSI-RS, e.g., a transmission timing parameter associated with the CSI-RS (e.g., A-TRS) 235. In another example, the DCI may include bits or fields that identify or otherwise indicate the channel condition change (e.g., BWP switching, beam switching, a secondary cell activation or deactivation). In that example, the indication of the channel condition change may serve as the indication that the CSI-RS (e.g., A-TRS) 235 has been triggered. As one example, a function of the DCI (e.g., a BWP switching DCI) may serve as a trigger for the CSI-RS (e.g., A-TRS) 235 transmission. In some aspects, the DCI may be a fallback DCI or a non-fallback DCI.

The base station 205 may configure and transmit a DCI that indicates the identified channel condition change and a resource allocation for transmission between the base station 205 and the UE 215. In an example, an A-TRS can be triggered by an uplink DCI. The A-TRS triggered by the uplink DCI may not involve an uplink transmission. In some cases, the uplink DCI may extend CSI-RS triggering e.g., an A-TRS indication may be separate from an indication of an aperiodic CSI-RS trigger. Accordingly, the uplink DCI may be configured to provide an indication of the A-TRS transmission (e.g., identify or otherwise indicate resources to be used for the A-TRS transmission) in combination with or separate from a CSI-RS trigger.

The UE 215 may receive the DCI that indicates the resource allocation for transmission between the UE 215 and the base station 205. As part of the resource allocation, the base station 205 may select, based on the channel condition change, a pattern of frequency and time resources for a CSI-RS for the UE 215. For example, the base station 205 may configure an arrangement of resource elements or RBs associated with the TTI 225-b, for the pattern of frequency and time resources for the CSI-RS (e.g., A-TRS) 235. In some cases, the UE 215 may identify, based on the received DCI, the pattern of frequency and time resources allocated for the CSI-RS (e.g., A-TRS) 235 to be transmitted by the base station 205. In some cases, the DCI that indicates the resource allocation for a CSI-RS (e.g., A-TRS) transmission may be transmitted in a same TTI as the CSI-RS (e.g., A-TRS) transmission. For example, the base station 205 may transmit a DCI in a control region of the TTI 225-b, indicating resources allocated for the CSI-RS (e.g., A-TRS) 235 to the UE 215, in which the CSI-RS (e.g., A-TRS) 235 transmission also occurs.

A CSI-RS may, in some cases, be associated with the DCI triggering BWP switching or beam switching, or both. A BWP may be a group of contiguous PRBs. The bandwidth of a BWP may be equal to or smaller than a maximum bandwidth capability supported by the UE 215 or a bandwidth of an overall carrier. In some cases, the bandwidth of the BWP may be at least as large as a bandwidth of a TRS. A BWP may be configured for downlink and for uplink. BWPs may be configured independently for each cell (e.g., primary cells and/or secondary cells). In such cases, if a secondary cell is deactivated, the BWPs of that cell may also be deactivated. In some cases, the UE 215 may be configured to communicate using one or more downlink BWPs and/or one or more uplink BWPs at the same time. In some cases, there is at most one active downlink BWP and at most one active uplink BWP at a given time for a serving cell. A primary serving cell (e.g., the base station 205) may be the cell that handles the RRC procedure between the UE 215 and the base station 205 and a secondary cell (not shown) may be any other serving cells established between the UE 215 and the base station 205.

In some cases, the BWP may be a dynamically-configured or semi-statically configured portion of the overall carrier. The BWP may include a number of dynamically or semi-statically configurable parameters. Examples of such parameters may include frequency location (e.g., center frequency), bandwidth (e.g., number of PRBs), numerology (e.g., sub-carrier spacing and/or cyclic prefix type), or a combination thereof. The parameters of the BWP may be communicated using DCI, a MAC-CE, RRC signaling, or any combination thereof. For example, when BWP switching is based on DCI, the BWP switching DCI may also trigger the CSI-RS (e.g., A-TRS) 235. The timeline with respect to the DCI can be configured via DCI or RRC signaling. In a downlink BWP switching DCI, some aspects may repurpose existing fields with a dummy downlink grant (e.g., such as a zero grant or an invalid grant) of the downlink BWP switching DCI or the downlink BWP DCI may trigger the CSI-RS (e.g., A-TRS) 235. In an uplink BWP switching DCI (e.g., involving a downlink BWP switching), the uplink BWP DCI may also trigger the CSI-RS (e.g., A-TRS) 235.

In some cases, the UE 215 may identify a fixed bandwidth value and identifying a bandwidth of a BWP in which a downlink shared channel (e.g., PDSCH) for the UE 215 is scheduled. In some cases, the base station 205 may identify a target BWP of a carrier to be used to communicate with the UE 215 on via the bi-directional communication link 220. The target BWP may be different from an active BWP being used to communicate with the UE 215 via the bi-directional communication link 220. The base station 205 may transmit to the UE 215 in a DCI, an indication for the UE 215 to switch from the active BWP to the target BWP. The UE 215 may receive in the DCI and change from the active BWP to the target BWP based on the received indication to switch BWPs. In some examples, the change from the active BWP to the target BWP during a same TTI during which the CSI-RS (e.g., A-TRS) 235 is received. Alternatively, the change from the active BWP to the target BWP may occur during a TTI different from a TTI during which the CSI-RS (e.g., A-TRS) 235 is received.

In some cases, the base station 205 may configure a wide bandwidth and/or a large number of RBs for the CSI-RS (e.g., A-TRS) 235. For example, the bandwidth of the CSI-RS (e.g., A-TRS) 235 may be a minimum of 50 RBs or $N_{RB}^{BWP}$, where $N_{RB}^{BWP}$ is the bandwidth of the BWP, expressed in units of RBs, in which a PDSCH is scheduled. The base station 205 may select to configure the wide bandwidth and/or the large number of RBs based at least in part on when a DCI triggers both BWP switching and beam switching, a frequency and time error is expected to be greater than a threshold error (e.g., in the case of beam switching), PDP and/or Doppler spread estimation is also required in addition to frequency and time tracking.

Alternatively, the bandwidth of the CSI-RS (e.g., A-TRS) 235 may be the same as the bandwidth of the scheduled PDSCH. The PDSCH may be scheduled by the same DCI that triggers the CSI-RS. The allocation of the PDSCH may be narrowband, e.g., which may also result in a narrowband CSI-RS (e.g., A-TRS). In some examples, at least for contiguous RB allocation (e.g., resource allocation (RA) type 1, without interleaving) for PDSCH, the base station 205 may configure to use the same bandwidth as the PDSCH for the CSI-RS (e.g., A-TRS) 235. This may reduce complexity for rate matching for other co-scheduled PDSCH, because the CSI-RS (e.g., A-TRS) transmission is configured within the band of a PDSCH. The base station 205 may select to configure the same bandwidth as the PDSCH for the CSI-RS (e.g., A-TRS) based at least in part on when a frequency and time error is expected to be less than the threshold error (e.g., revisiting a previous used beam), or a small allocation of RBs for PDSCH (e.g., an RB allocation less than a threshold value), or both. For example, the base station 205 may configure the same bandwidth as the PDSCH for the CSI-RS (e.g., A-TRS) 235, in the case of small time and frequency error when the UE 215 switches to a beam previously used. In some cases, the base station 205 may configure or signal a specific bandwidth and RB pattern to the UE 215 for non-contiguous PDSCH allocation. Non-contiguous allocations for the CSI-RS (e.g., A-TRS) may be a regular pattern of RBs allocated for CSI-RS together with RBs not allocated for CSI-RS within a particular TTI or number of symbol periods, or an irregular pattern of RBs allocated for CSI-RS together with RBs not allocated for CSI-RS within a particular TTI or number of symbol periods. Non-contiguous allocation may use interleaving in some cases. The base station 205 may configure or signal a bandwidth and RB pattern to the UE 215 via semi-statically or dynamically selected by a DCI.

In some cases, the base station 205 may identify a threshold value for a beam parameter associated with a channel (e.g., bi-directional communication link 220) between the base station 205 and the UE 215. In some examples, the beam parameter may include a delay spread, a Doppler spread, a Doppler shift, an average gain, an average delay, an angle of arrival, an angle of departure, or a combination thereof. Additionally, or alternatively, the beam parameter may include at least one of a physical data control channel (PDCCH) error rate, a physical data shared channel (PDSCH) error rate, a reference signal received quality (RSRQ), a signal-to-interference-plus-noise ratio (SINR), a reference signal received power (RSRP), or a combination thereof. The base station 205 may monitor for a beam misalignment based on the identified threshold value. For example, the base station 205 may measure or compute a delay spread, a Doppler spread, a Doppler shift, an average gain, an average delay, an angle of arrival, or an angle of departure, and compare it to a threshold value (that may be preconfigured by the base station 205). The base station 205 may detect the beam misalignment based on a value of a measured beam parameter being above the identified threshold value.

In the case of beam switching, the UE 215 may receive, from the base station 205, control information and process it to identify timing information associated with the beam switch, and determine a symbol location (e.g., index or position of a symbol within the TTI 225) associated with the beam switch based on the timing information and symbol level scheduling. The symbol location may identify a symbol period of the TTI 225 that occurs immediately prior to the beam switch, immediately after the beam switch, or the like. The base station 205 and the UE 215 may perform a beam switch from a first beam to a second beam based on the control information.

In some cases, the base station 205 may provide the beam switch indication in a DCI to switch beams for communication based on the detected beam misalignment. When beam switching is based on DCI, the beam switching DCI may also trigger the CSI-RS (e.g., A-TRS) 235, after a mmW beam change (e.g., a PDSCH beam change). The UE 215 may perform, based on the indication to switch beams, a beam switch procedure during a same TTI during which the CSI-RS is received (e.g., TTI 225-b). Alternatively, the UE 215 may perform, based on the indication to switch beams, a beam switch procedure in a TTI different from a TTI during which the CSI-RS is received, for example, during TTI 225-*c* than TTI 225-*b*. In some cases, for mmW beam changes, there may be no concerns with respect to decoding the DCI triggering the CSI-RS (e.g., A-TRS) 235. In some aspects, triggering of the CSI-RS (e.g., A-TRS) 235 transmission may be tied to the DCI indicating the mmW beam change. The timeline with respect to the DCI indicating the mmW beam change and the CSI-RS (e.g., A-TRS) 235 transmission may be configurable, e.g., via DCI or RRC. The UE 215 may receive the CSI-RS (e.g., A-TRS) 235 from the base station 205 using the identified pattern of time and frequency resources.

The wireless communication system 200 may, in some examples, support multiplexing a CSI-RS with other transmission. For example, the base station 205 may multiplex a CSI-RS with other transmissions. In some examples, the base station 205 may frequency division multiplex the CSI-RS (e.g., A-TRS) 235 and a payload (e.g., a PDSCH payload), and transmit the multiplexed CSI-RS (e.g., A-TRS) 235 to the UE 215. Alternatively, or additionally, the base station 205 may time division multiplex the CSI-RS (e.g., A-TRS) 235 and a payload (e.g., a PDSCH payload), and transmit the multiplexed CSI-RS (e.g., A-TRS) 235 to the UE 215.

The base station 205 and the UE 215 may support an aperiodic zero-power-TRS (ZP-TRS) and/or ZP-CSI-RS for frequency and time tracking, to rate match around resources associated with the aperiodic ZP-TRS for other co-scheduled UEs 215. The base station 205 may configure TRS using resources allocation directed to ZP-CSI-RS. The base station 205 may indicate this configuration in an RRC parameter (e.g., ZP-CSI-RS-ResourceConfigList). Additionally, or alternatively, the base station 205 may provide a separate DCI field as described herein, for triggering and selecting ZP-TRS. In some cases, rate matching may include avoiding the ZP-CSI-RS resource elements (e.g., by transmitting in resource elements around the ZP-CSI-RS resource elements). The UE 215 may receive a DCI on a physical control channel in a TTI 225. The DCI may indicate whether a PDSCH of the UE 215 in the TTI is rate-matched around resource elements indicated by the ZP-TRS. The UE 215 may decode the PDSCH in the TTI 225 based on rate-matching around the resource elements indicated by the ZP-TRS when the DCI indicates the PDSCH of the UE 215 is rate-matched around the resource elements indicated by the ZP-TRS.

Figure 3:
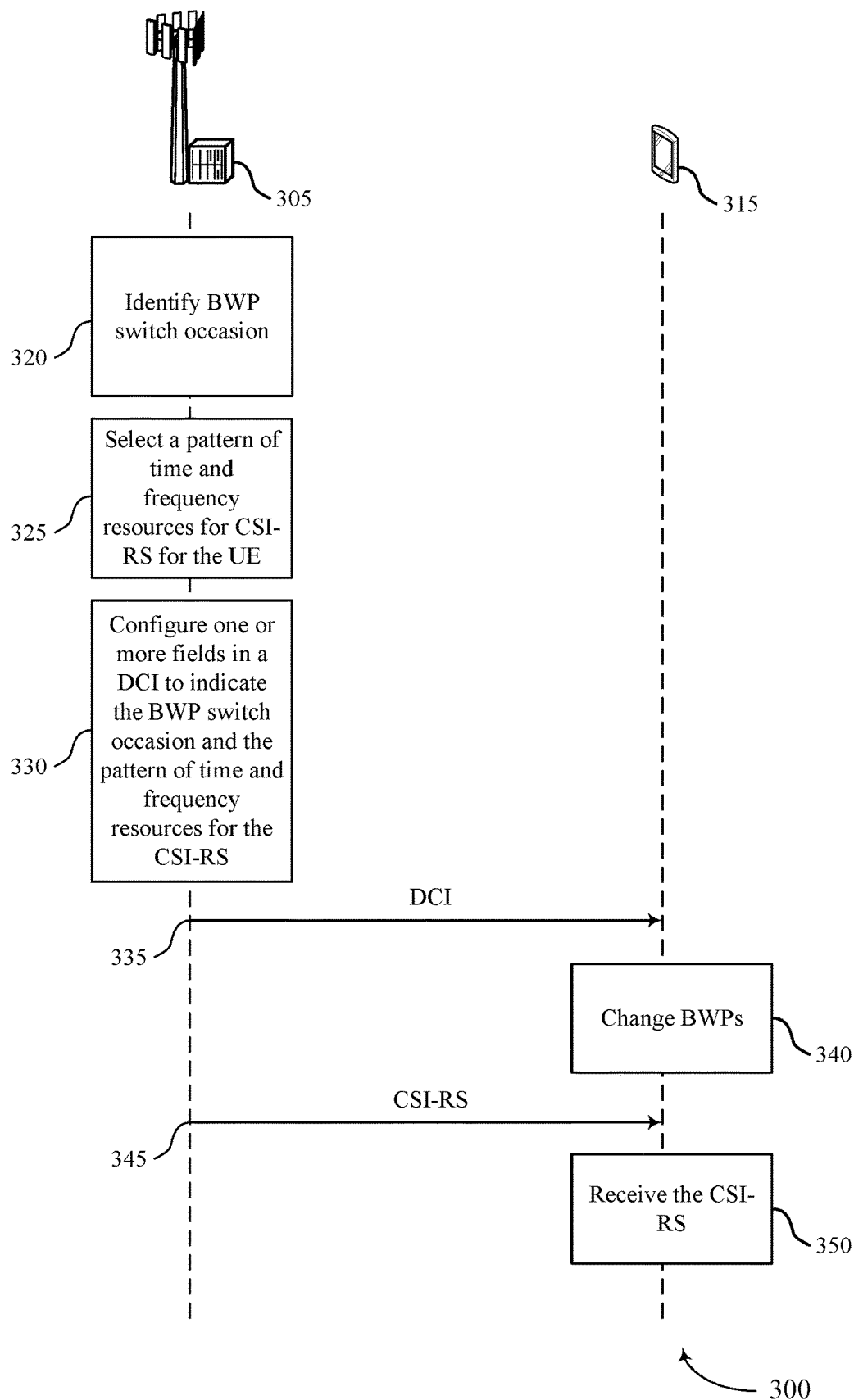
FIGS. 3 and 4 illustrate examples of a process flow that supports CSI-RS in accordance with aspects of the present disclosure.

FIG. 3 illustrates an example of a process flow 300 that supports CSI-RS in accordance with various aspects of the present disclosure. In some examples, the process flow 300 may implement aspects of the wireless communications system 100 and 200. Base station 305 and UE 315 may be examples of the corresponding devices described with reference to FIGS. 1 and 2.

In the following description of the process flow 300, the operations between the base station 305 and the UE 315 may be transmitted in a different order than the exemplary order shown, or the operations performed by the base station 305 and the UE 315 may be performed in different orders or at different times. Certain operations may also be left out of the process flow 300, or other operations may be added to the process flow 300.

At 320, the base station 305 may identify a BWP switch occasion. The base station 305 may establish a connection with the UE 315 using a CC. The CC may include multiple BWPs, each BWP having a portion of frequency bandwidth of the CC. In some cases, different BWPs may have different subcarrier spacing. If UE 315 is utilizing multiple BWPs, the base station 305 may determine that the UE 315 may switch transmissions from a first BWP to a second BWP. In some implementations, the BWP switch occasion may be a way to limit an operating bandwidth of the UE 315 at a given time. For cases of low-bandwidth operations, it may be beneficial to conserve bandwidth. For example, a CC may be 100 MHz and the UE 315 may operate within 20 MHz. In such an example, to conserve bandwidth and to save power, the UE 315 can be configured to operate on a BWP on the CC. In some cases, the UE 315 may be dynamically switched from one BWP to another BWP. Such switching from one BWP to another BWP may be performed using a DCI. For example, the base station 305 may identify a target BWP of a carrier to be used to communicate with the UE 315. The target BWP may be different from an active BWP being used to communicate with the UE 315, and the base station 305 may signal the BWP switch occasion from the active BWP to the target BWP in a DCI.

At 325, the base station 305 may select a pattern of time and frequency resources for a CSI-RS for the UE 315. In some cases, the selection of the pattern may be based on a channel change condition such as the BWP switch occasion.

At 330, the base station 305 may configure one or more fields in the DCI to indicate the BWP switch occasion and the pattern of time and frequency resources for the CSI-RS. At 335, the base station 350 may transmit the DCI to the UE 315.

At 340, the UE 315 may change BWPs. For example, the UE 315 may receive the DCI and change from an active BWP to a target BWP based at least in part on the received indication to switch BWPs. At 345, the base station 305 may transmit a CSI-RS to the UE 315. At 350, the UE 315 may receive the CSI-RS from the base station 305. In some cases, the DCI may be transmitted in a same TTI in which the CSI-RS is transmitted. Alternatively, the DCI may be transmitted in a different TTI from a TTI in which the CSI-RS is transmitted.

Figure 4:
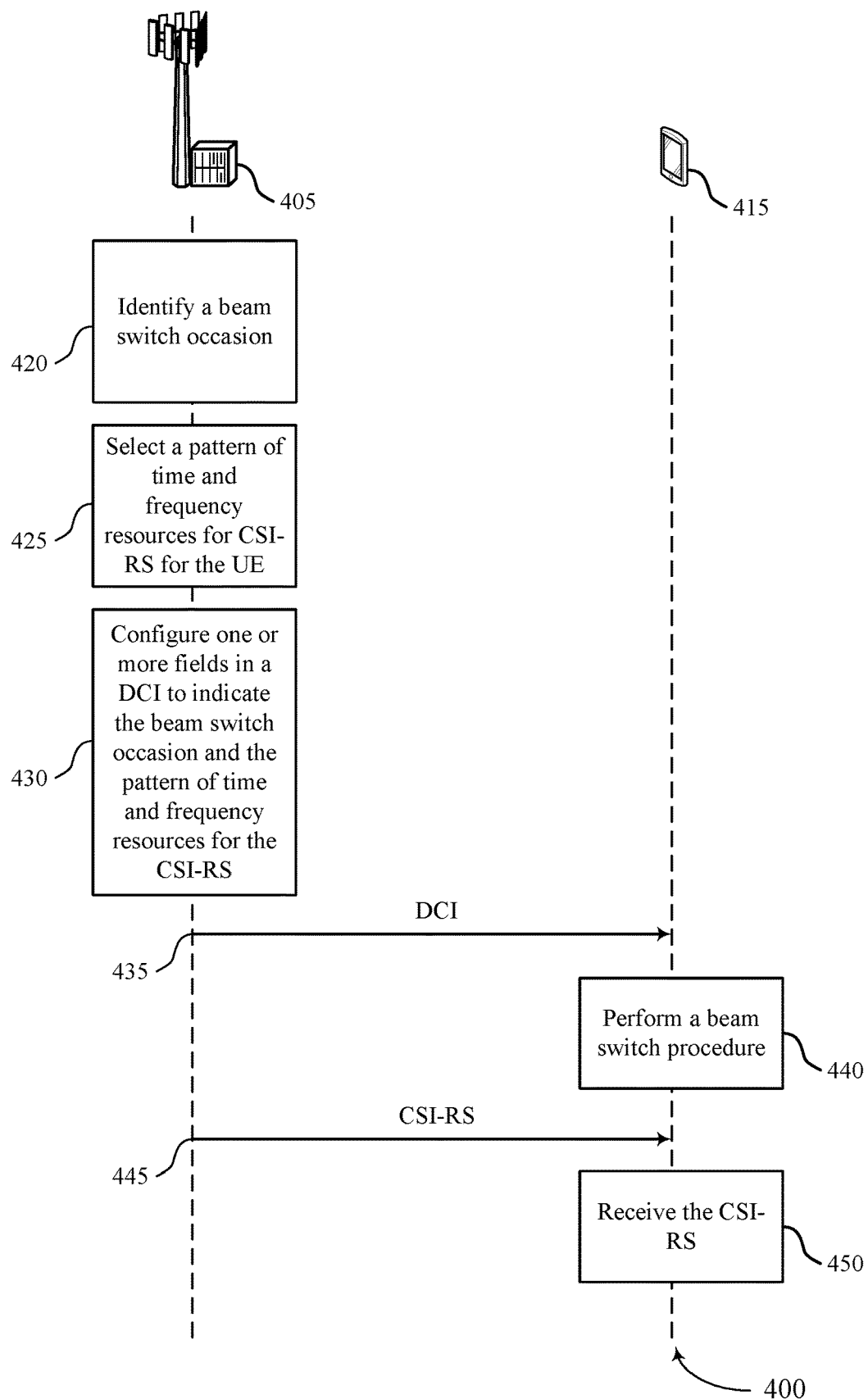

FIG. 4 illustrates an example of a process flow 400 that supports CSI-RS in accordance with various aspects of the present disclosure. In some examples, the process flow 400 may implement aspects of the wireless communications system 100 and 200. Base station 405 and UE 415 may be examples of the corresponding devices described with reference to FIGS. 1 and 2.

In the following description of the process flow 400, the operations between the base station 405 and the UE 415 may be transmitted in a different order than the exemplary order shown, or the operations performed by the base station 405 and the UE 415 may be performed in different orders or at different times. Certain operations may also be left out of the process flow 400, or other operations may be added to the process flow 400.

At 420, the base station 405 may identify a beam switch occasion. A beam switch occasion may occur because of beam misalignment (e.g., beam alignment percentage, ratio of an amplitude and phase error of a transmission/reception path of a beam), a beam recovery failure, a beam performance metric (e.g., PHY/MAC layer metric) being below a threshold value, and the like. The beam switch occasion may also include requesting the UE 415 to switch to a different beam for communication with the base station 405. For example, the base station 405 may identify a threshold value for a beam parameter associated with a channel between the base station 405 and the UE 415. The beam parameter may include a delay spread, a Doppler spread, a Doppler shift, an average gain, an average delay, an angle of arrival, an angle of departure, or a combination thereof. The base station 405 may monitor for a beam misalignment associated with the channel based on the identified threshold value. The base station 405 may detect the beam misalignment associated with the channel based on a value of a measured beam parameter being above the identified threshold value.

At 425, the base station 405 may select a pattern of time and frequency resources for a CSI-RS for the UE 415. In some cases, the selection of the pattern may be based on a channel change condition such as, the beam switch occasion.

At 430, the base station 405 may configure one or more fields in the DCI to indicate the beam switch occasion and the pattern of time and frequency resources for the CSI-RS. At 435, the base station 450 may transmit the DCI to the UE 415.

At 440, the UE 415 may perform a beam switch procedure. For example, the UE 415 may receive, in the DCI, an indication to switch beams used for transmissions between the UE 415 and the base station 405 in the DCI, the pattern of time and frequency resources identified based at least in part on the indication to switch beams.

At 445, the base station 405 may transmit an A-TRS to the UE 415. At 450, the UE 415 may receive the CSI-RS from the base station 405. In some cases, the DCI may be transmitted in a same TTI in which the CSI-RS is transmitted. Alternatively, the DCI may be transmitted in a different TTI from a TTI in which the CSI-RS is transmitted.

Figure 5:
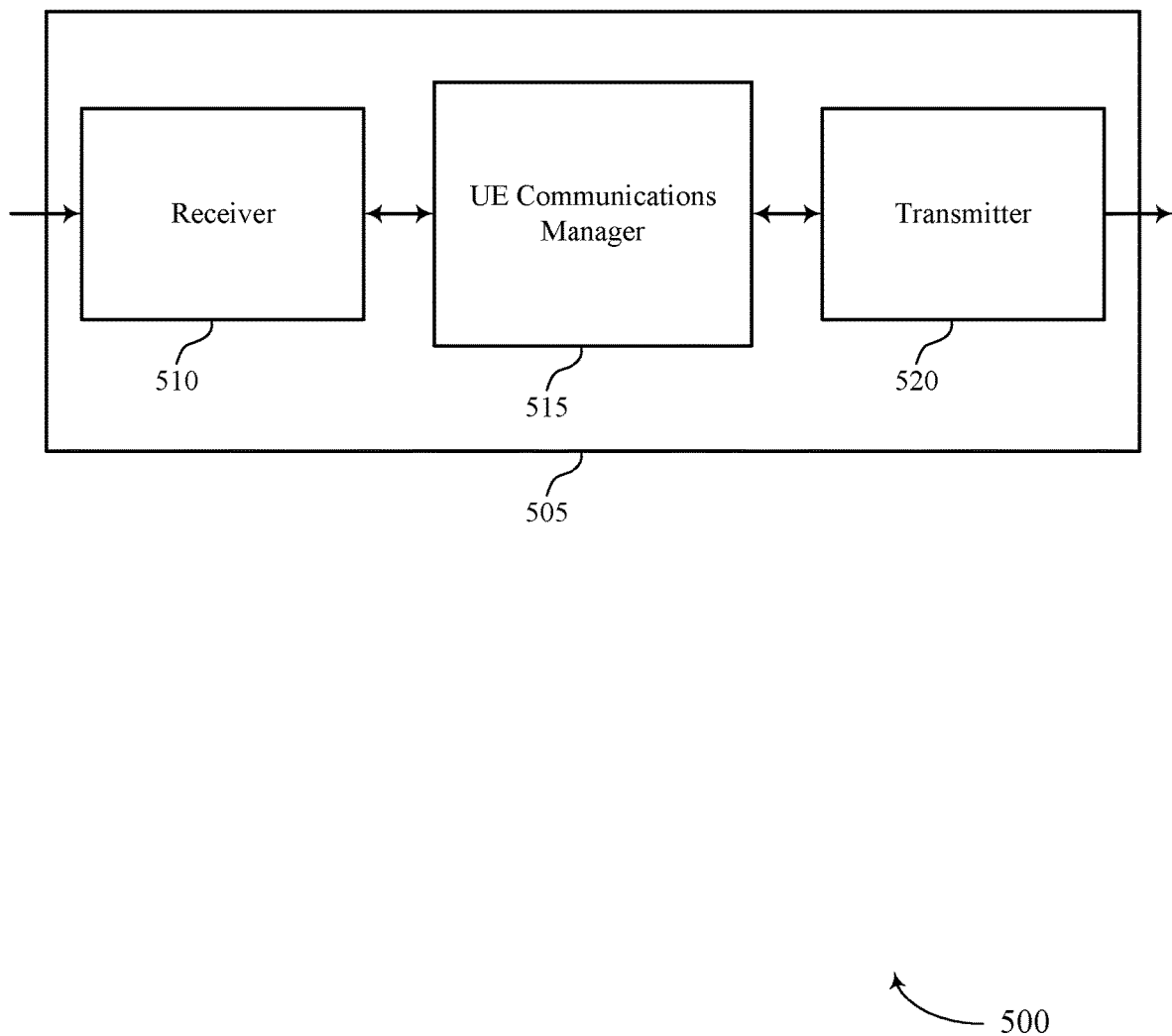
FIGS. 5 through 7 show block diagrams of a device that supports CSI-RS in accordance with aspects of the present disclosure.

FIG. 5 shows a block diagram 500 of a wireless device 505 that supports CSI-RS in accordance with aspects of the present disclosure. Wireless device 505 may be an example of aspects of a user equipment (UE) 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to CSI-RS, etc.). Information may be passed on to other components of the wireless device 505. The receiver 510 may be an example of aspects of the transceiver 835 described with reference to FIG. 8. The receiver 510 may utilize a single antenna or a set of antennas.

Receiver 510 may receive DCI that indicates a resource allocation for transmissions between the UE 115 and a base station 105. Receiver 510 may receive CSI-RS using an identified pattern of time and frequency resources. Receiver 510 may receive a DCI message, radio resource control signaling, or a combination thereof, that includes configuration information. Receiver 510 may receive, in the DCI, an indication to switch beams used for transmissions between the UE 115 and the base station 105 in the DCI, the pattern of time and frequency resources identified based on the indication to switch beams. Receiver 510 may receive, in the DCI, an indication to switch BWPs. UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE communications manager 515 may identify, based on the received DCI, a pattern of time and frequency resources allocated for a CSI-RS to be transmitted by the base station 105.

Transmitter 520 may transmit signals generated by other components of the wireless device 505. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
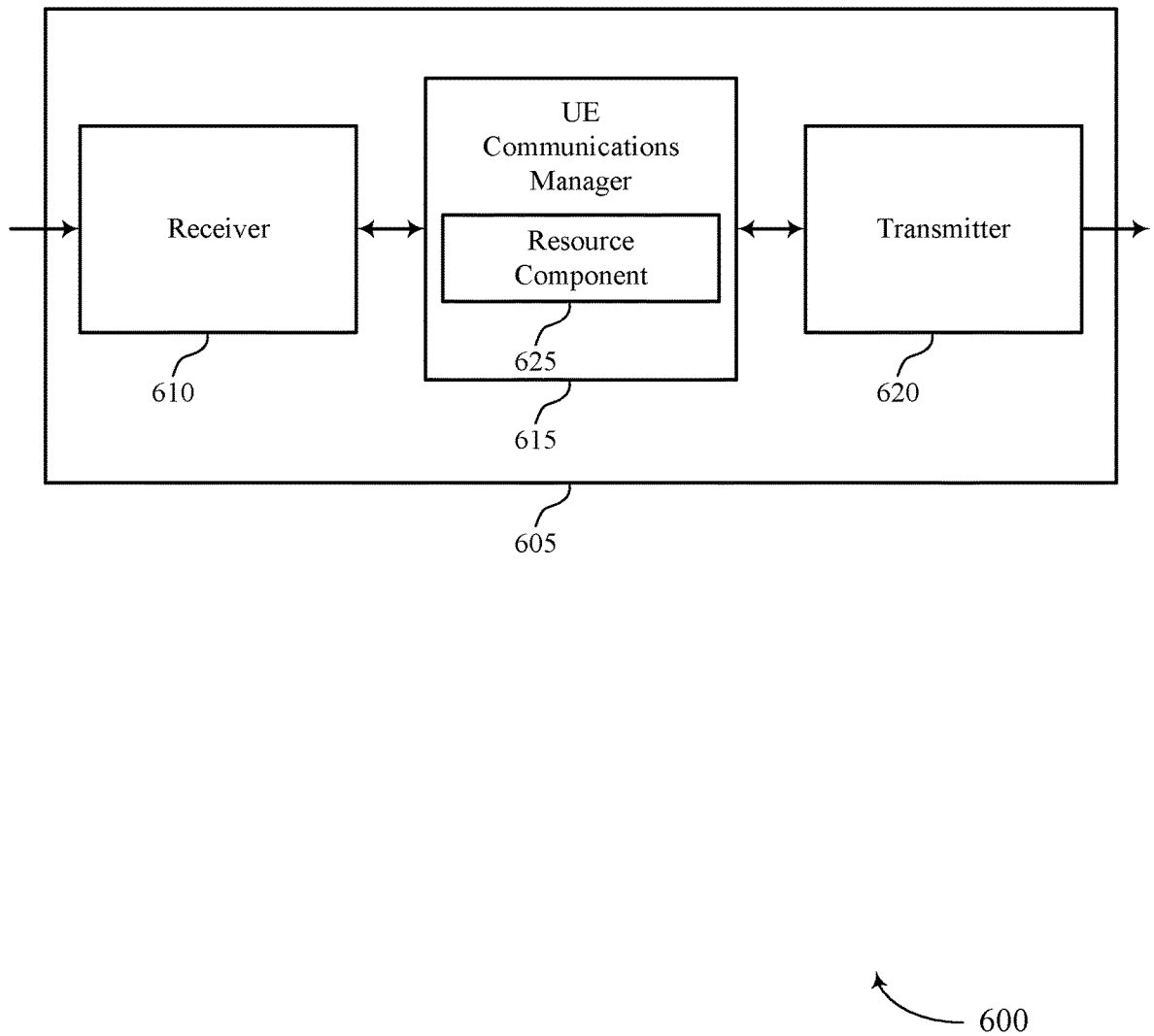

FIG. 6 shows a block diagram 600 of a wireless device 605 that supports CSI-RS in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to CSI-RS, etc.). Information may be passed on to other components of the wireless device 605. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include resource component 625. Resource component 625 may identify, based on a received DCI, a pattern of time and frequency resources allocated for a CSI-RS to be transmitted by a base station 105. In some cases, the pattern of time and frequency resources for the CSI-RS includes discontiguous resource blocks and subcarriers.

Transmitter 620 may transmit signals generated by other components of the wireless device 605. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
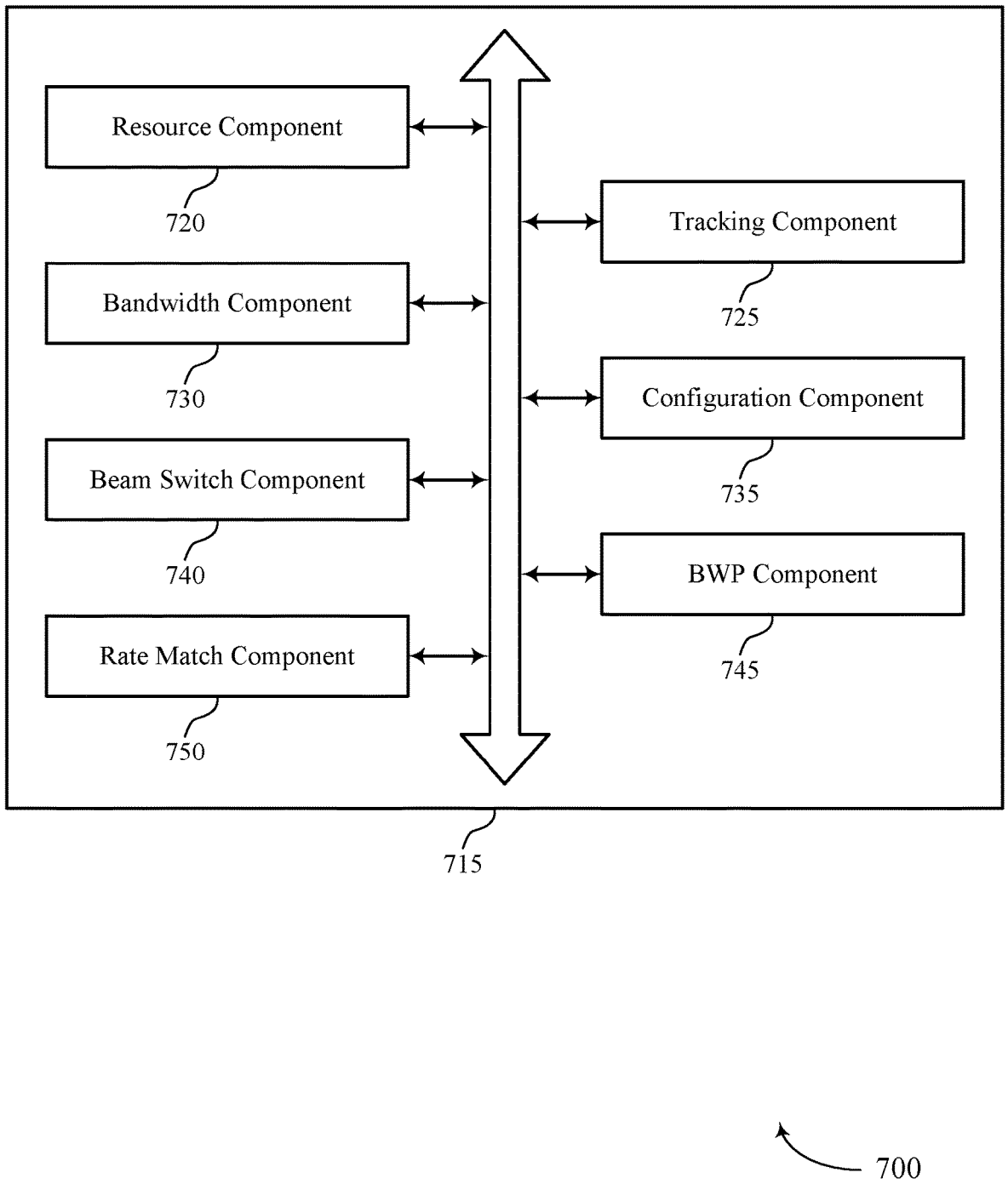

FIG. 7 shows a block diagram 700 of a UE communications manager 715 that supports CSI-RS in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include resource component 720, tracking component 725, bandwidth component 730, configuration component 735, beam switch component 740, BWP component 745, and rate match component 750. Each of these modules may communicate, directly or indirectly, with one another (e.g., via one or more buses).

Resource component 720 may identify, based on a received DCI, a pattern of time and frequency resources allocated for a CSI-RS for tracking to be transmitted by a base station 105. In some cases, the pattern of time and frequency resources for the CSI-RS includes discontiguous resource blocks and subcarriers. Tracking component 725 may perform frequency and time tracking based on the received CSI-RS.

Bandwidth component 730 may identify a fixed bandwidth value. Bandwidth component 730 may identify a bandwidth of a bandwidth part in which a downlink shared channel for a UE 115 is scheduled. Bandwidth component 730 may determine a bandwidth of the CSI-RS to be a minimum of the identified fixed bandwidth value and the identified bandwidth for the bandwidth part. Bandwidth component 730 may identify a bandwidth of a downlink shared channel scheduled for the UE, and determine a bandwidth of the CSI-RS based on the identified bandwidth for the of the downlink shared channel.

Configuration component 735 may receive configuration information for the CSI-RS. The pattern of time and frequency resources allocated for the CSI-RS is identified based on the received configuration information and the received DCI. In some cases, the configuration information may include a portion of a bandwidth, an offset, a periodicity, a beam, a density, a subcarrier spacing, a resource block pattern, or a combination thereof.

Beam switch component 740 may perform, based on the indication to switch beams, a beam switch procedure during a same TTI during which the CSI-RS is received. Beam switch component 740 may perform, based on the indication to switch beams, a beam switch procedure in a first TTI different from a second TTI during which the CSI-RS is received.

BWP component 745 may change from an active BWP to a target BWP based on a received indication to switch BWPs. In some cases, the UE 115 changes from the active BWP to the target BWP during a same TTI during which the CSI-RS is received. In some cases, the UE 115 changes from the active BWP to the target BWP during a first TTI different from a second TTI during which the CSI-RS is received. Rate match component 750 may rate matching a physical data channel transmission around time and frequency resources allocated to the ZP-TRS. In some cases, the UE 115 is configured to support a ZP-TRS.

Figure 8:
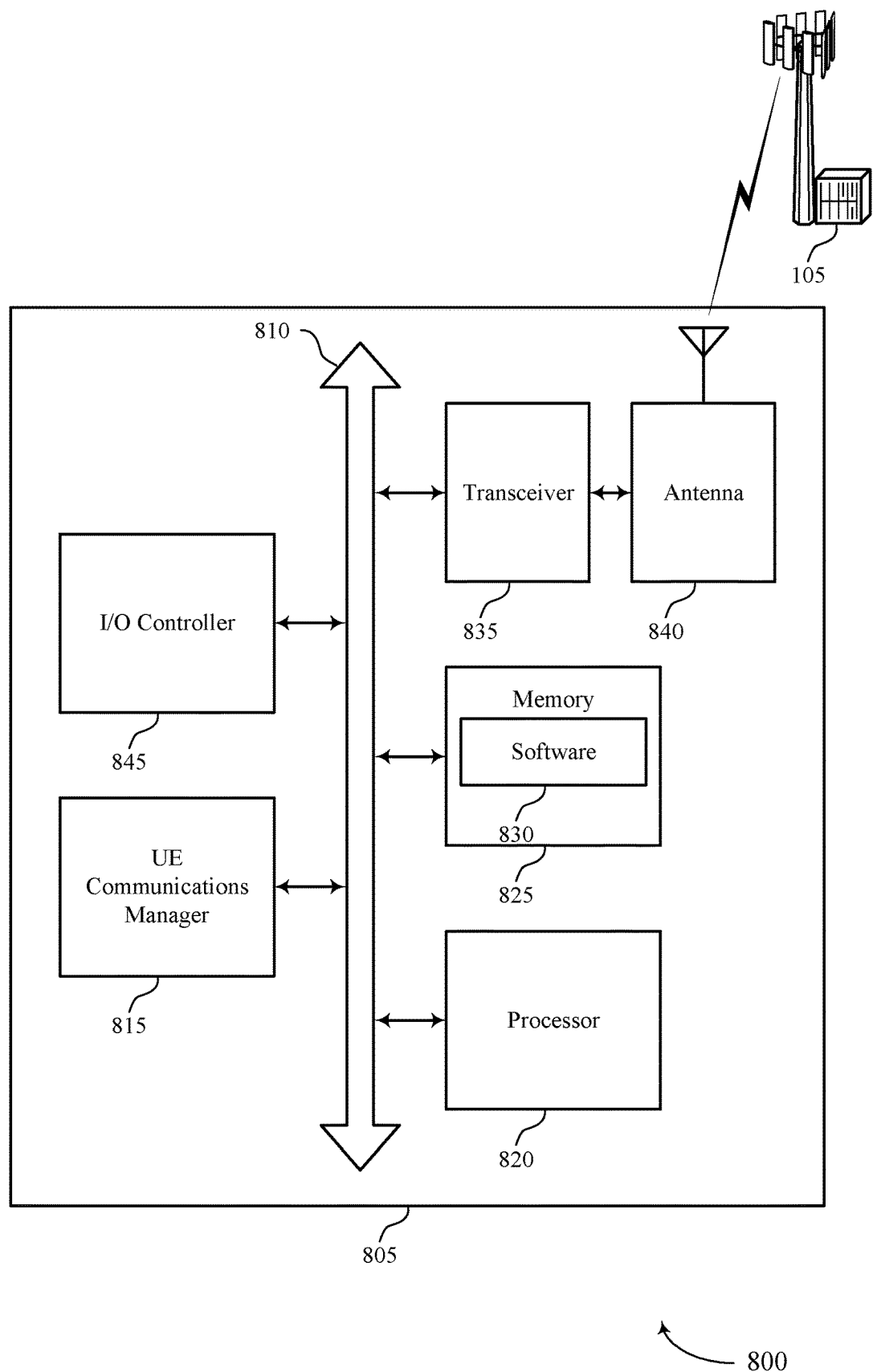
FIG. 8 illustrates a block diagram of a system including a UE that supports CSI-RS in accordance with aspects of the present disclosure.

FIG. 8 shows a diagram of a system 800 including a wireless device 805 that supports CSI-RS in accordance with aspects of the present disclosure. Wireless device 805 may be an example of or include the components of wireless device 505, wireless device 605, or a UE 115 as described above, e.g., with reference to FIGS. 5 and 6. Wireless device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Wireless device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting CSI-RS).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support CSI-RS. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device 805 may include a single antenna 840. However, in some cases the wireless device 805 may have more than one antenna 840, which may be capable of concurrently transmitting or receiving multiple wireless transmissions.

I/O controller 845 may manage input and output signals for wireless device 805. I/O controller 845 may also manage peripherals not integrated into wireless device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with wireless device 805 via I/O controller 845 or via hardware components controlled by I/O controller 845.

Figure 9:
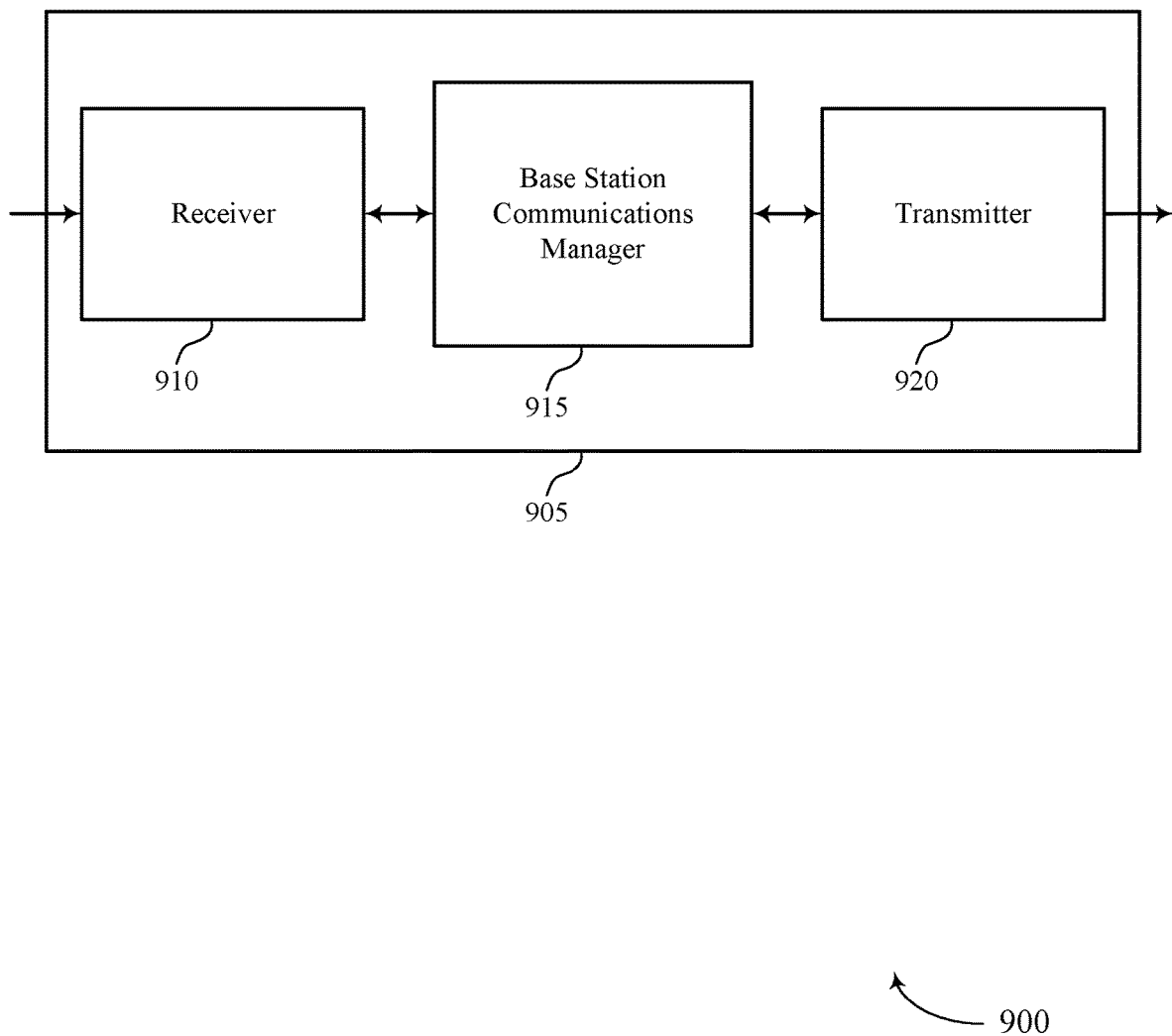
FIGS. 9 through 11 show block diagrams of a device that supports CSI-RS in accordance with aspects of the present disclosure.

FIG. 9 shows a block diagram 900 of a wireless device 905 that supports CSI-RS in accordance with aspects of the present disclosure. Wireless device 905 may be an example of aspects of a base station 105 as described herein. Wireless device 905 may include receiver 910, base station communications manager 915, and transmitter 920. Wireless device

905 may also include a processor. Each of these components may be in communication with one another (e.g., via one or more buses).

Receiver 910 may receive information such as packets, user data, or control information associated with various information channels (e.g., control channels, data channels, and information related to CSI-RS, etc.). Information may be passed on to other components of the wireless device 905. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a channel condition change for a channel between a base station 105 and a UE 115 and select, based on the channel condition change, a pattern of time and frequency resources for a CSI-RS for the UE. In some cases, base station communications manager 915 may identify a pattern of time and frequency resources for a CSI-RS for tracking for a UE 115, transmit DCI that indicates the identified pattern of time and frequency resources allocated for the CSI-RS for tracking, and transmit the CIS-RS using the identified pattern of time and frequency resources.

Transmitter 920 may transmit signals generated by other components of the wireless device 905. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Transmitter 920 may transmit DCI that indicates the identified channel condition change and a resource allocation for transmissions between the base station 105 and the UE 115. Transmitter 920 may transmit the CSI-RS using the identified pattern of time and frequency resources. Transmitter 920 may transmit, to the UE, configuration information for the CSI-RS. The configuration information may include a portion of a bandwidth, or an offset, or a periodicity, or a beam, or a density, or a subcarrier spacing, or a resource block pattern, or a combination thereof. Transmitter 920 may transmit, in the DCI, an indication to switch beams for communication via the channel based on the detected beam misalignment. The DCI may further include the beam switch indication. Transmitter 920 may transmit, to the UE 115 in the DCI, an indication for the UE 115 to switch from an active BWP to a target BWP. Transmitter 920 may transmit the DCI in a same TTI in which the CSI-RS is transmitted. Transmitter 920 may transmit the DCI in a first TTI different from a second TTI in which the CSI-RS is transmitted. In some cases, the configuration information is transmitted in a DCI message, or radio resource control signaling, or a combination thereof. In some cases, the CSI-RS includes a CSI-RS for tracking frequency and time.

Figure 10:
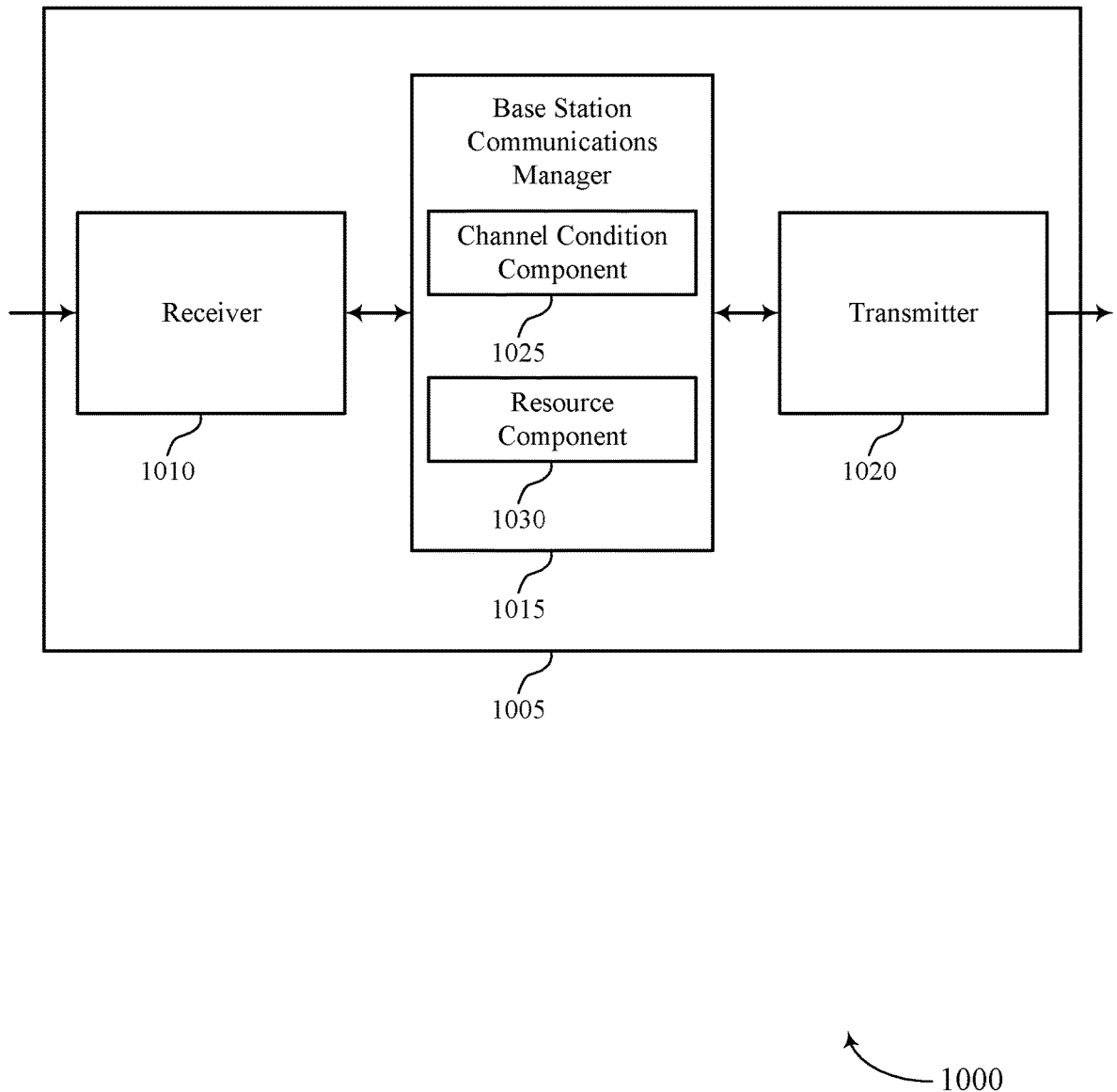

FIG. 10 shows a block diagram 1000 of a wireless device 1005 that supports CSI-RS in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to CSI-RS, etc.). Information may be passed on to other components of the wireless device 1005. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include channel condition component 1025 and resource component 1030.

Channel condition component 1025 may identify a channel condition change for a channel between a base station 105 and a UE 115. In some cases, the channel condition change includes at least one of a BWP switching occasion, or a beam switch occasion, or a combination thereof. In some cases, channel condition component 1025 may identify a pattern of time and frequency resources for a CSI-RS for tracking for a UE 115. Resource component 1030 may select, based on the channel condition change, a pattern of time and frequency resources for a CSI-RS for the UE 115.

Transmitter 1020 may transmit signals generated by other components of the wireless device 1005. In some cases, transmitter 1020 may transmit DCI that indicates the identified pattern of time and frequency resources allocated for the CSI-RS for tracking, and transmit the CIS-RS using the identified pattern of time and frequency resources. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
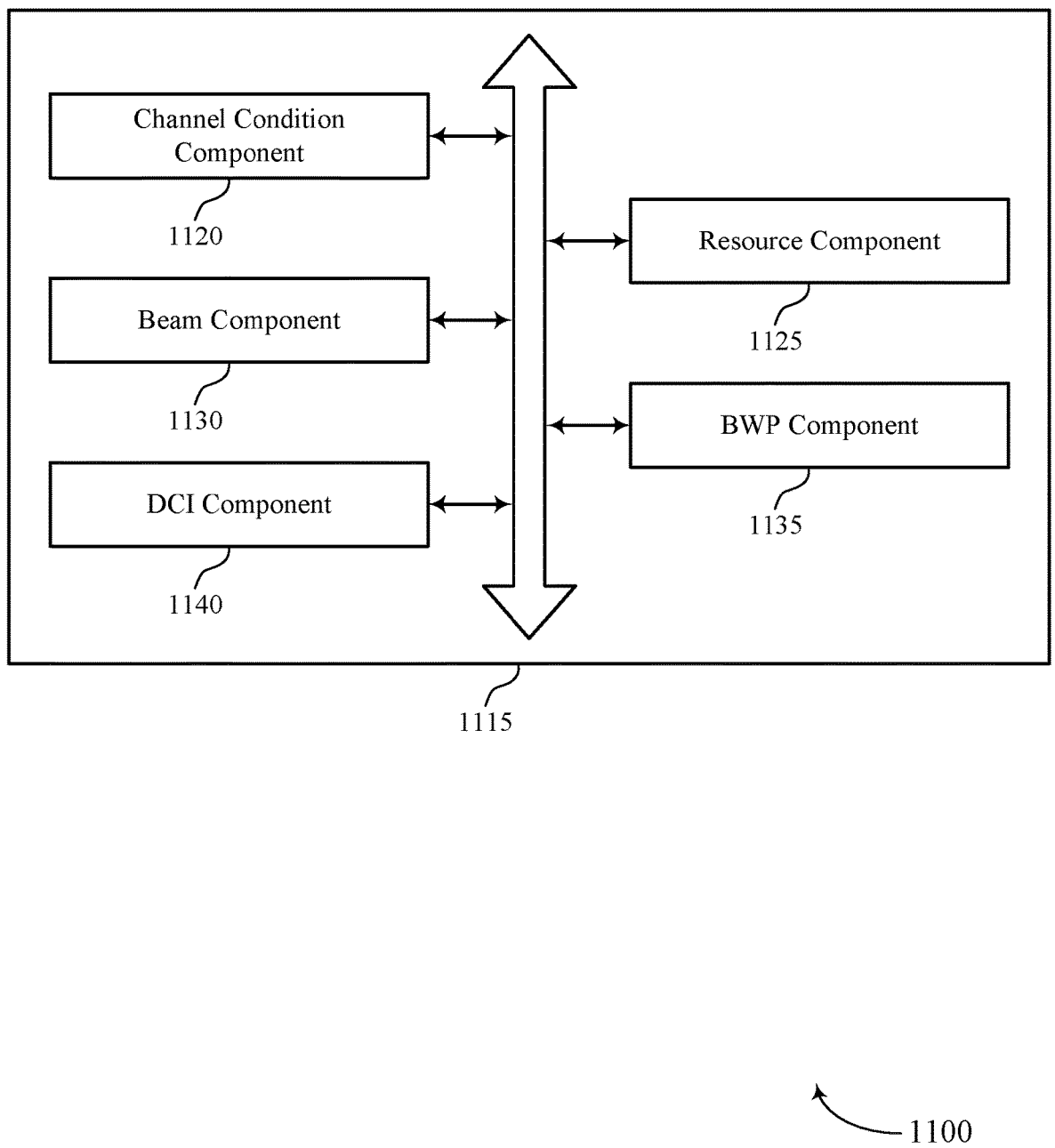

FIG. 11 shows a block diagram 1100 of a base station communications manager 1115 that supports CSI-RS in accordance with aspects of the present disclosure. The base station communications manager 1115 may be an example of aspects of a base station communications manager 1215 described with reference to FIGS. 9, 10, and 12. The base station communications manager 1115 may include channel condition component 1120, resource component 1125, beam component 1130, BWP component 1135, and DCI component 1140. Each of these modules may communicate, directly or indirectly, with one another (e.g., via one or more buses).

Channel condition component 1120 may identify a channel condition change for a channel between a base station 105 and a UE 115. In some cases, the channel condition change includes at least one of a BWP switching occasion, or a beam switch occasion, or a combination thereof. Resource component 1125 may select, based on the channel condition change, a pattern of time and frequency resources for a CSI-RS for the UE 115.

Beam component 1130 may identify a threshold value for a beam parameter associated with the channel between the base station 105 and the UE 115. The beam parameter may include a delay spread, or a Doppler spread, or a Doppler shift, or an average gain, or an average delay, or an angle of arrival, or an angle of departure, or a combination thereof. Beam component 1130 may monitor for a beam misalignment associated with the channel based on the identified threshold value, and detect the beam misalignment associated with the channel based on a value of a measured beam parameter being above the identified threshold value. In some cases, the beam parameter may include at least one of a PDCCH error rate, a PDSCH error rate, a RSRQ, a SINR, a RSRP, or a combination thereof.

BWP component 1135 may identify a target BWP of a carrier to be used to communicate with the UE 115 on the channel, the target BWP may be different from an active BWP being used to communicate with the UE 115 on the channel. DCI component 1140 may configure one or more fields in the DCI to indicate the channel condition change and the pattern of time and frequency resources for the CSI-RS.

Figure 12:
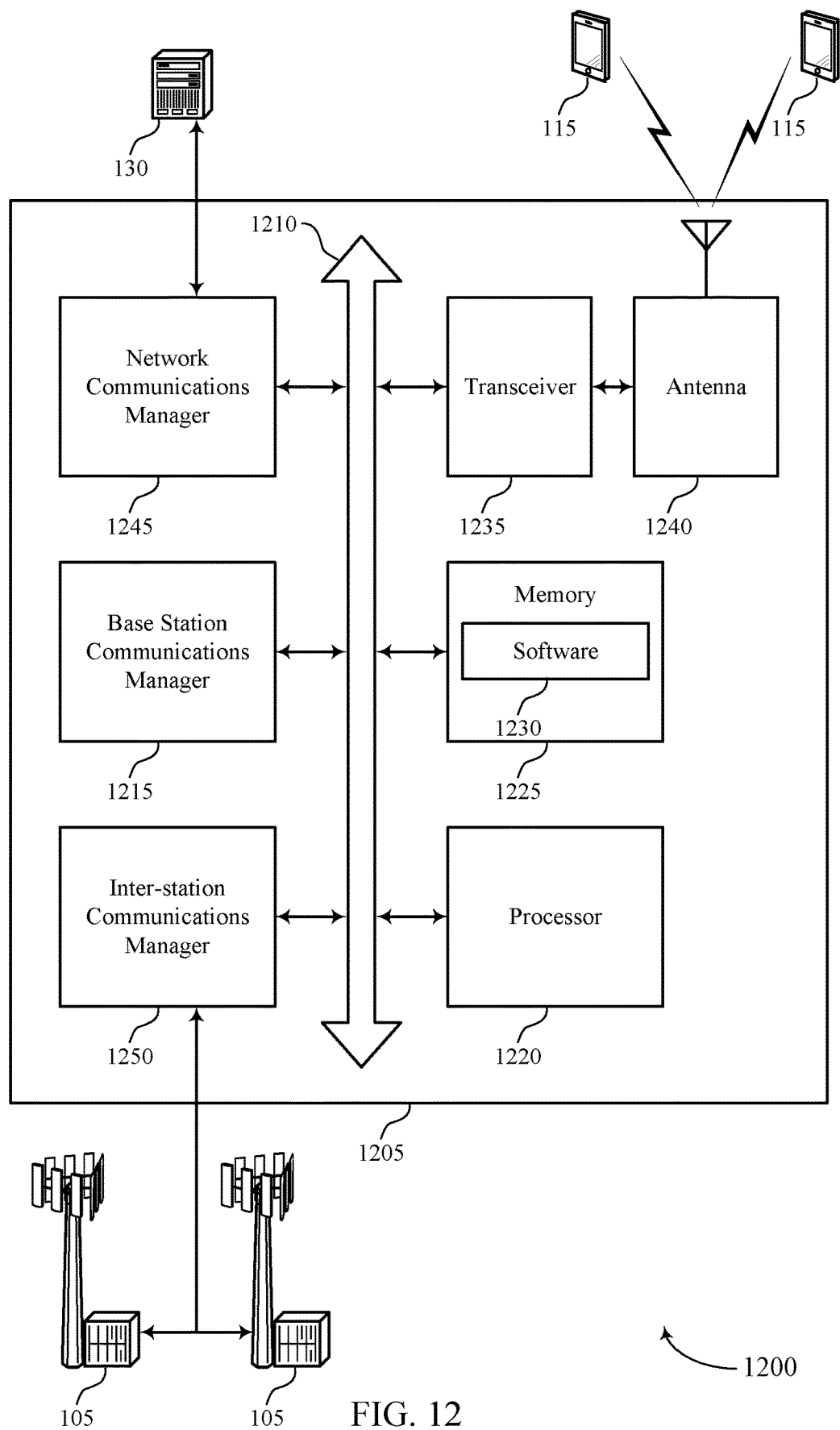
FIG. 12 illustrates a block diagram of a system including a base station that supports CSI-RS in accordance with aspects of the present disclosure.

FIG. 12 shows a diagram of a system 1200 including a wireless device 1205 that supports CSI-RS in accordance with aspects of the present disclosure. Wireless device 1205 may be an example of or include the components of base station 105 as described above, e.g., with reference to FIG. 1. Wireless device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Wireless device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting CSI-RS).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support CSI-RS. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device 1205 may include a single antenna 1240. However, in some cases the wireless device 1205 may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
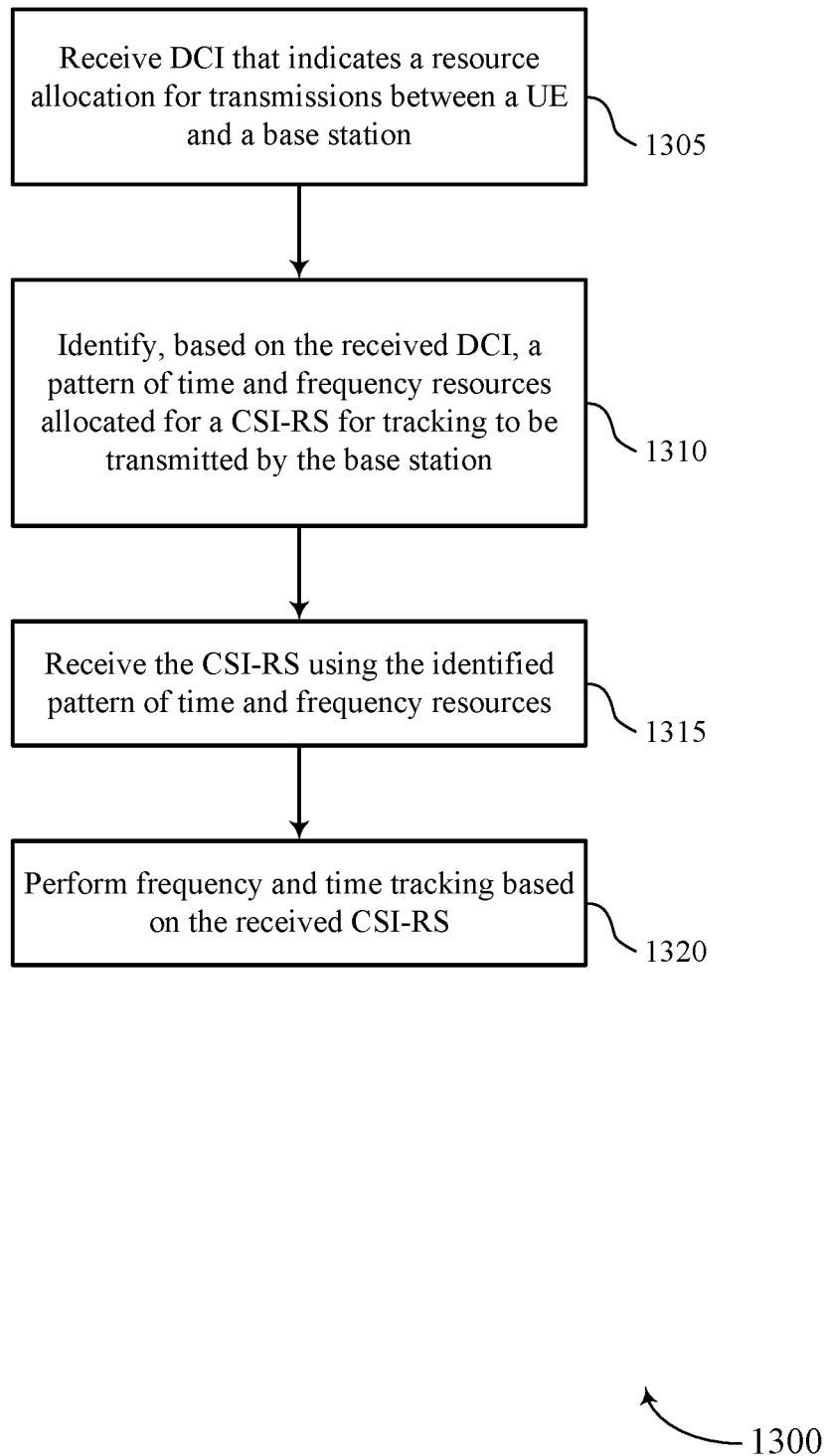
FIGS. 13 through 17 illustrate methods for CSI-RS in accordance with aspects of the present disclosure.

FIG. 13 shows a flowchart illustrating a method 1300 for CSI-RS in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305, the UE 115 may receive DCI that indicates a resource allocation for transmissions between the UE 115 and a base station 105. The operations of 1305 may be performed according to the methods described herein. In certain examples, aspects of the operations of 1305 may be performed by a receiver as described with reference to FIGS. 5 through 8.

At 1310, the UE 115 may identify, based at least in part on the received DCI, a pattern of time and frequency resources allocated for a CSI-RS for tracking to be transmitted by the base station 105. The operations of 1310 may be performed according to the methods described herein. In certain examples, aspects of the operations of 1310 may be performed by a resource component as described with reference to FIGS. 5 through 8.

At 1315, the UE 115 may receive the CSI-RS using the identified pattern of time and frequency resources. The operations of 1315 may be performed according to the methods described herein. In certain examples, aspects of the operations of 1315 may be performed by a receiver as described with reference to FIGS. 5 through 8.

At 1320, the UE 115 may perform frequency and time tracking based at least in part on the received CSI-RS. The operations of 1320 may be performed according to the methods described herein. In certain examples, aspects of the operations of 1320 may be performed by a tracking component as described with reference to FIGS. 5 through 8.

Figure 14:
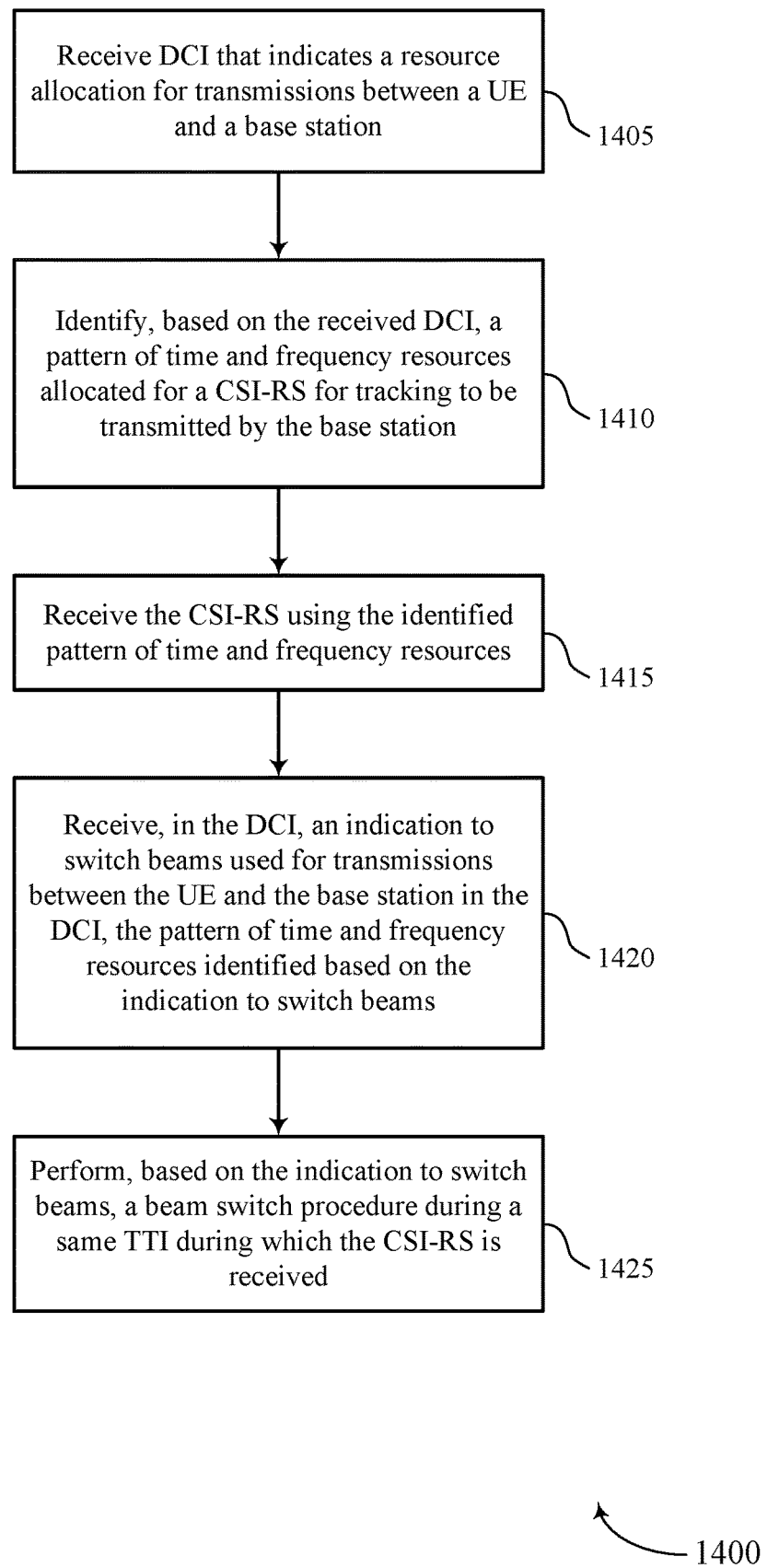

FIG. 14 shows a flowchart illustrating a method 1400 for CSI-RS in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive DCI that indicates a resource allocation for transmissions between the UE 115 and a base station 105. The operations of 1405 may be performed according to the methods described herein. In certain examples, aspects of the operations of 1405 may be performed by a receiver as described with reference to FIGS. 5 through 8.

At 1410, the UE 115 may identify, based at least in part on the received DCI, a pattern of time and frequency resources allocated for a CSI-RS for tracking to be transmitted by the base station 105. The operations of 1410 may be performed according to the methods described herein. In certain examples, aspects of the operations of 1410 may be performed by a resource component as described with reference to FIGS. 5 through 8.

At 1415, the UE 115 may receive the CSI-RS using the identified pattern of time and frequency resources. The operations of 1415 may be performed according to the methods described herein. In certain examples, aspects of the operations of 1415 may be performed by a receiver as described with reference to FIGS. 5 through 8.

At 1420, the UE 115 may receive, in the DCI, an indication to switch beams used for transmissions between the UE 115 and the base station 105 in the DCI, the pattern of time and frequency resources identified based at least in part on the indication to switch beams. The operations of 1420 may be performed according to the methods described herein. In certain examples, aspects of the operations of 1420 may be performed by a receiver as described with reference to FIGS. 5 through 8.

At 1425, the UE 115 may perform, based at least in part on the indication to switch beams, a beam switch procedure during a same TTI during which the CSI-RS is received. The operations of 1425 may be performed according to the methods described herein. In certain examples, aspects of the operations of 1425 may be performed by a beam switch component as described with reference to FIGS. 5 through 8.

Figure 15:
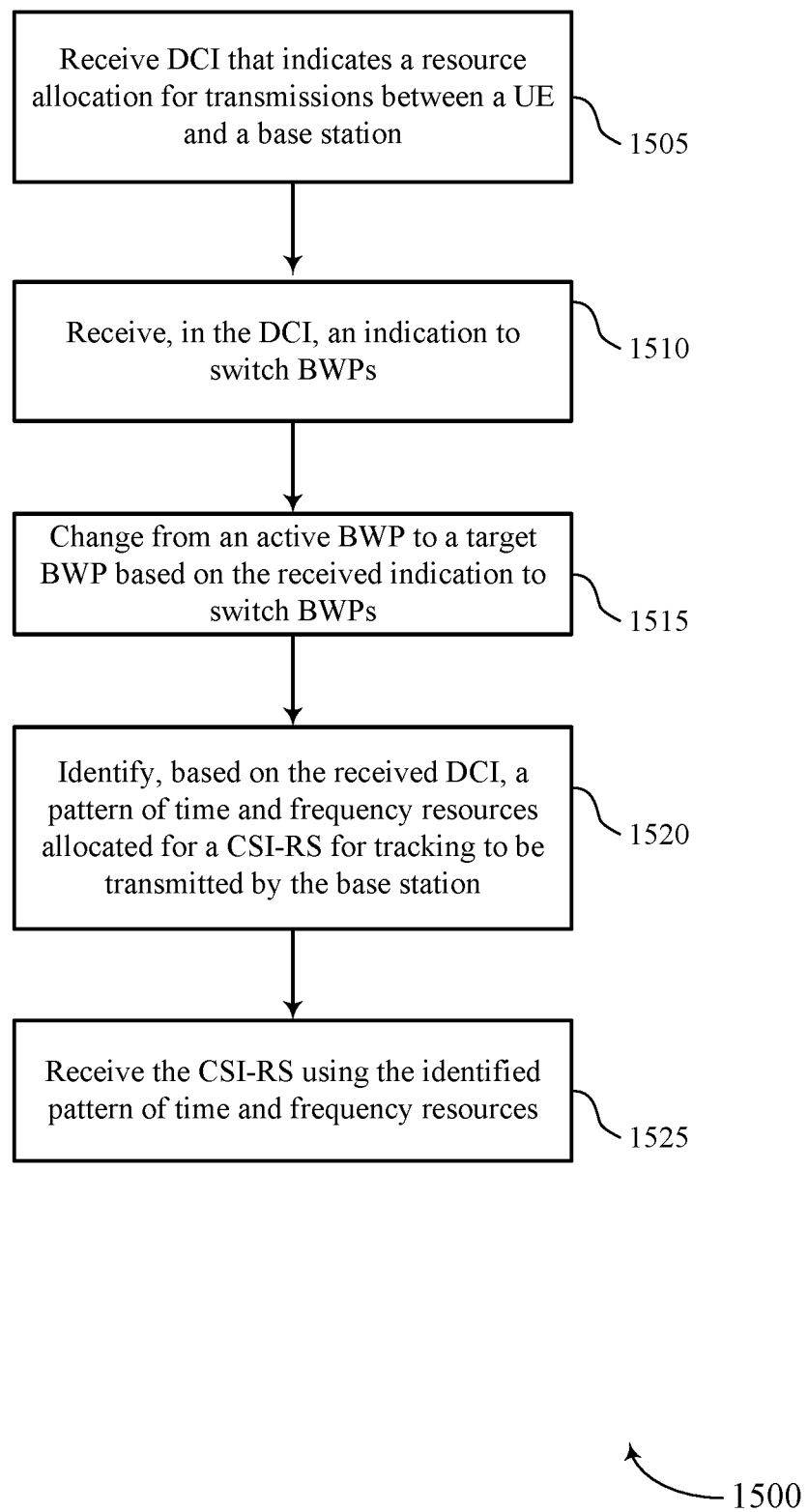

FIG. 15 shows a flowchart illustrating a method 1500 for CSI-R in accordance with aspects of the present disclosure.

The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may receive DCI that indicates a resource allocation for transmissions between the UE 115 and a base station 105. The operations of 1505 may be performed according to the methods described herein. In certain examples, aspects of the operations of 1505 may be performed by a receiver as described with reference to FIGS. 5 through 8.

At 1510, the UE 115 may receive, in the DCI, an indication to switch BWPs. The operations of 1510 may be performed according to the methods described herein. In certain examples, aspects of the operations of 1510 may be performed by a receiver as described with reference to FIGS. 5 through 8.

At 1515, the UE 115 may change from an active BWP to a target BWP based at least in part on the received indication to switch BWPs. The operations of 1515 may be performed according to the methods described herein. In certain examples, aspects of the operations of 1515 may be performed by a BWP component as described with reference to FIGS. 5 through 8.

At 1520, the UE 115 may identify, based at least in part on the received DCI, a pattern of time and frequency resources allocated for a CSI-RS to be transmitted by the base station 105. The operations of 1520 may be performed according to the methods described herein. In certain examples, aspects of the operations of 1520 may be performed by a resource component as described with reference to FIGS. 5 through 8.

At 1525, the UE 115 may receive the CSI-RS using the identified pattern of time and frequency resources. The operations of 1525 may be performed according to the methods described herein. In certain examples, aspects of the operations of 1525 may be performed by a receiver as described with reference to FIGS. 5 through 8.

Figure 16:
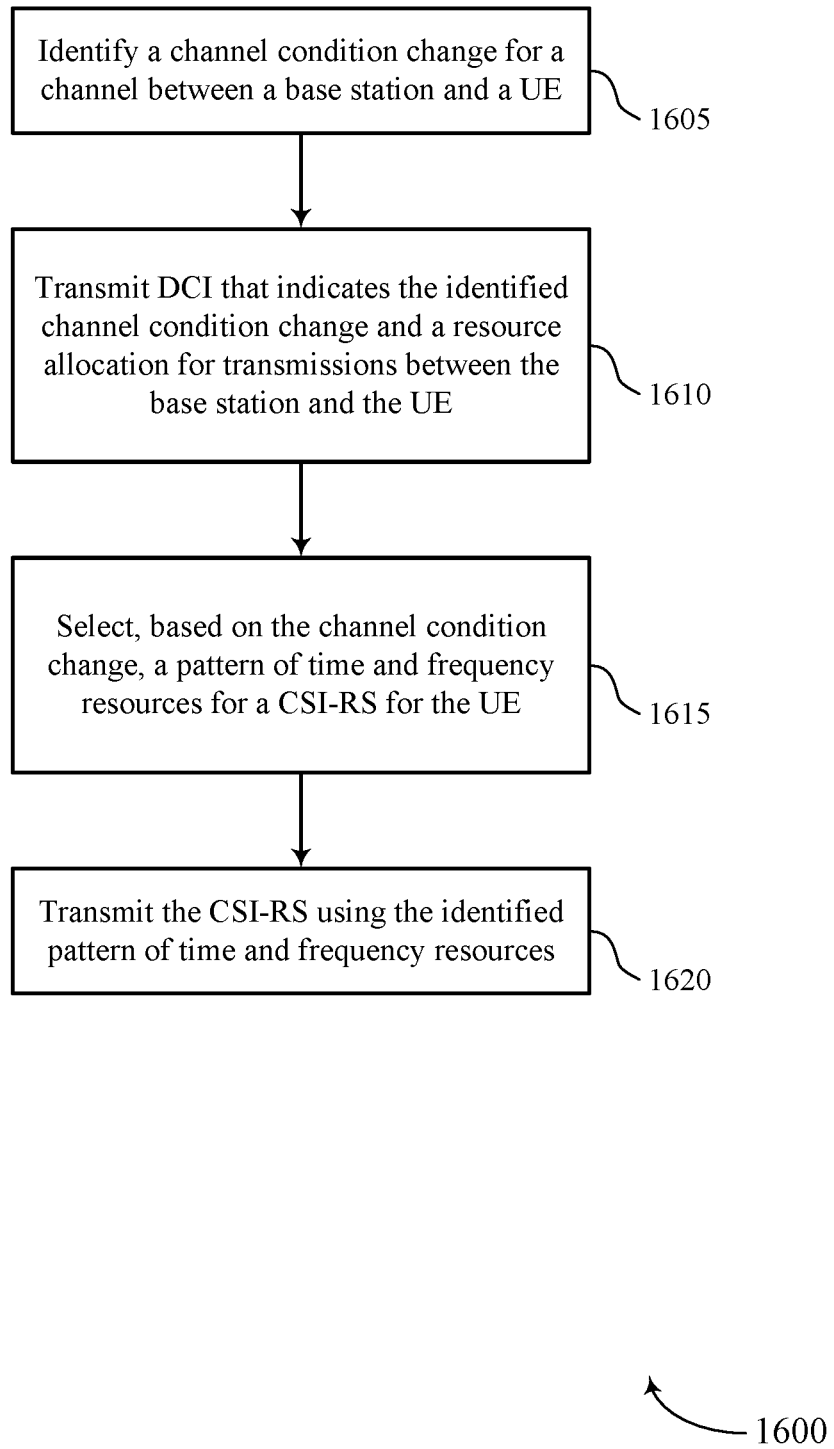

FIG. 16 shows a flowchart illustrating a method 1600 for CSI-RS in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may identify a channel condition change for a channel between the base station 105 and a UE 115. The operations of 1605 may be performed according to the methods described herein. In certain examples, aspects of the operations of 1605 may be performed by a channel condition component as described with reference to FIGS. 9 through 12.

At 1610, the base station 105 may transmit DCI that indicates the identified channel condition change and a resource allocation for transmissions between the base station 105 and the UE 115. The operations of 1610 may be performed according to the methods described herein. In certain examples, aspects of the operations of 1610 may be performed by a transmitter as described with reference to FIGS. 9 through 12.

At 1615, the base station 105 may select, based at least in part on the channel condition change, a pattern of time and frequency resources for a CSI-RS for the UE 115. The operations of 1615 may be performed according to the methods described herein. In certain examples, aspects of the operations of 1615 may be performed by a resource component as described with reference to FIGS. 9 through 12.

At 1620, the base station 105 may transmit the CSI-RS using the identified pattern of time and frequency resources. The operations of 1620 may be performed according to the methods described herein. In certain examples, aspects of the operations of 1620 may be performed by a transmitter as described with reference to FIGS. 9 through 12.

Figure 17:
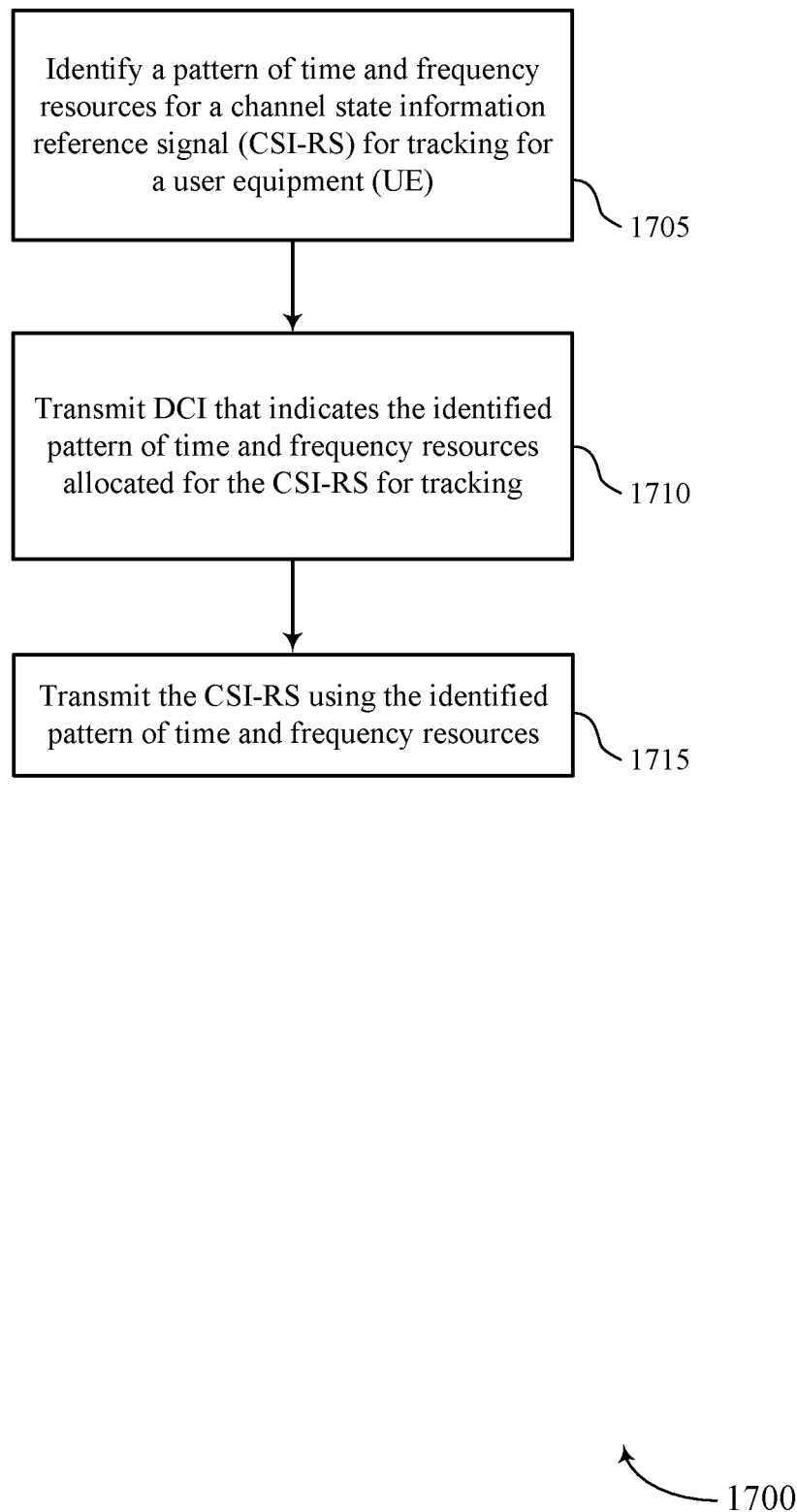

FIG. 17 shows a flowchart illustrating a method 1700 for CSI-RS in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may identify pattern of time and frequency resources for a channel state information reference signal (CSI-RS) for tracking for a UE 115. The operations of 1705 may be performed according to the methods described herein. In certain examples, aspects of the operations of 1705 may be performed by a channel condition component as described with reference to FIGS. 9 through 12.

At 1710, the base station 105 may transmit DCI that indicates the identified pattern of time and frequency resources allocated for the CSI-RS for tracking. The operations of 1710 may be performed according to the methods described herein. In certain examples, aspects of the operations of 1710 may be performed by a transmitter as described with reference to FIGS. 9 through 12.

At 1715, the base station 105 may transmit the CSI-RS using the identified pattern of time and frequency resources. The operations of 1715 may be performed according to the methods described herein. In certain examples, aspects of the operations of 1715 may be performed by a transmitter as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving downlink control information (DCI) that indicates a resource allocation for transmissions between the UE and a base station;
   identifying, based at least in part on the received DCI, a set of aperiodic time and frequency resources allocated for a channel state information reference signal (CSI-RS) for tracking to be transmitted by the base station;
   identifying a second bandwidth of a downlink shared channel scheduled for the UE;
   determining a bandwidth for the CSI-RS based at least in part on the identified second bandwidth of the downlink shared channel scheduled for the UE; and
   receiving the CSI-RS using the identified set of aperiodic time and frequency resources based at least in part on the bandwidth for the CSI-RS.

2. The method of claim 1, further comprising:
   performing frequency and time tracking based at least in part on the received CSI-RS.

3. The method of claim 1, wherein determining the bandwidth for the CSI-RS comprises:
   identifying a fixed bandwidth value;
   identifying the second bandwidth of a BWP in which the downlink shared channel for the UE is scheduled; and
   determining the bandwidth of the CSI-RS to be a minimum of the identified fixed bandwidth value and the identified second bandwidth.

4. The method of claim 1, further comprising:
   receiving configuration information for the CSI-RS, wherein the set of aperiodic time and frequency resources allocated for the CSI-RS is identified based at least in part on the received configuration information and the received DCI.

5. The method of claim 4, wherein the configuration information comprises a portion of the bandwidth, or an offset, or a periodicity, or a beam, or a density, or a subcarrier spacing, or a resource block pattern, or a combination thereof.

6. The method of claim 4, wherein receiving the configuration information for the CSI-RS comprises:
receiving a DCI message, or radio resource control signaling, or a combination thereof, that includes the configuration information.

7. The method of claim 1, further comprising:
receiving, in the DCI, an indication to switch beams used for transmissions between the UE and the base station, the set of aperiodic time and frequency resources identified based at least in part on the indication to switch beams.

8. The method of claim 7, further comprising:
performing, based at least in part on the indication to switch beams, a beam switch procedure during a same transmission time interval (TTI) during which the CSI-RS is received.

9. The method of claim 7, further comprising:
performing, based at least in part on the indication to switch beams, a beam switch procedure in a first TTI different from a second TTI during which the CSI-RS is received.

10. The method of claim 1, further comprising:
receiving, in the DCI, an indication to switch BWPs; and
changing from an active BWP to a target BWP based at least in part on the received indication to switch BWPs.

11. The method of claim 10, wherein the UE changes from the active BWP to the target BWP during a same transmission time interval (TTI) during which the CSI-RS is received.

12. The method of claim 10, wherein the UE changes from the active BWP to the target BWP during a first transmission time interval (TTI) different from a second TTI during which the CSI-RS is received.

13. The method of claim 1, wherein the UE is configured to support a zero power tracking reference signal (ZP-TRS).

14. The method of claim 13, further comprising:
rate-matching a physical data channel transmission around time and frequency resources allocated to the ZP-TRS.

15. The method of claim 1, wherein the set of aperiodic time and frequency resources for the CSI-RS comprises discontiguous resource blocks and subcarriers.

16. A method for wireless communication at a base station, comprising:
identifying a set of aperiodic time and frequency resources for a channel state information reference signal (CSI-RS) for tracking for a user equipment (UE);
identifying a second bandwidth of a downlink shared channel scheduled for the UE;
determining a bandwidth for the CSI-RS based at least in part on the identified second bandwidth of the downlink shared channel scheduled for the UE;
transmitting downlink control information (DCI) that indicates the identified set of aperiodic time and frequency resources allocated for the CSI-RS for tracking; and
transmitting the CSI-RS using the identified set of aperiodic time and frequency resources based at least in part on the bandwidth for the CSI-RS.

17. The method of claim 16, further comprising:
transmitting, to the UE, configuration information for the CSI-RS, the configuration information comprising a portion of the bandwidth, or an offset, or a periodicity, or a beam, or a density, or a subcarrier spacing, or a resource block pattern, or a combination thereof.

18. The method of claim 17, wherein the configuration information is transmitted in a DCI message, or radio resource control signaling, or a combination thereof.

19. The method of claim 16, further comprising:
identifying a target BWP of a carrier to be used to communicate with the UE on a channel, the target BWP different from an active BWP being used to communicate with the UE on the channel.

20. The method of claim 19, further comprising:
transmitting, to the UE in the DCI, an indication for the UE to switch from the active BWP to the target BWP.

21. The method of claim 16, further comprising:
configuring one or more fields in the DCI to indicate a channel condition change and the set of aperiodic time and frequency resources for the CSI-RS.

22. The method of claim 16, further comprising:
transmitting the DCI in a same transmission time interval (TTI) in which the CSI-RS is transmitted.

23. The method of claim 16, further comprising:
transmitting the DCI in a first transmission time interval (TTI) different from a second TTI in which the CSI-RS is transmitted.

24. An apparatus for wireless communication, comprising:
a processor;
memory coupled with the processor; and
instructions stored in the memory and executable by the processor to cause the apparatus to:
receive downlink control information (DCI) that indicates a resource allocation for transmissions between the apparatus and a base station;
identify, based at least in part on the received DCI, a set of aperiodic time and frequency resources allocated for a channel state information reference signal (CSI-RS) for tracking to be transmitted by the base station;
identify a second bandwidth of a downlink shared channel scheduled for the apparatus;
determine a bandwidth for the CSI-RS based at least in part on the identified second bandwidth of the downlink shared channel scheduled for the UE; and
receive the CSI-RS using the identified set of aperiodic time and frequency resources based at least in part on the bandwidth for the CSI-RS.

25. The apparatus of claim 24, wherein the instructions are further executable by the processor to cause the apparatus to:
perform frequency and time tracking based at least in part on the received CSI-RS.

26. The apparatus of claim 24, wherein the instructions to determine the bandwidth of the CSI-RS are further executable by the processor to cause the apparatus to:
identify a fixed bandwidth value;
identify the second bandwidth of a BWP in which the downlink shared channel for the apparatus is scheduled; and
determine the bandwidth for the CSI-RS to be a minimum of the identified fixed bandwidth value and the identified second bandwidth.

27. The apparatus of claim 24, wherein the instructions are further executable by the processor to cause the apparatus to:

receive configuration information for the CSI-RS, wherein the set of aperiodic time and frequency resources allocated for the CSI-RS for tracking is identified based at least in part on the configuration information and the received DCI; and receive a DCI message, or radio resource control signaling, or a combination thereof, that includes the configuration information.

28. The apparatus of claim 24, wherein the instructions are further executable by the processor to cause the apparatus to:

receive, in the DCI, an indication to switch beams used for transmissions between the apparatus and the base station in the DCI, the set of aperiodic time and frequency resources identified based at least in part on the indication to switch beams.

29. An apparatus for wireless communication, comprising:

a processor;

memory coupled with the processor; and instructions stored in the memory and executable by the processor to cause the apparatus to:

identify a set of aperiodic time and frequency resources for channel state information reference signal (CSI-RS) for tracking for a user equipment (UE);

identify a second bandwidth of a downlink shared channel scheduled for the UE;

determine a bandwidth for the CSI-RS based at least in part on the identified second bandwidth of the downlink shared channel scheduled for the UE;

transmitting downlink control information (DCI) that indicates the identified set of aperiodic time and frequency resources for the CSI-RS for tracking; and transmitting the CSI-RS using the identified set of aperiodic time and frequency resources based at least in part on the bandwidth for the CSI-RS.

* * * * *